United States Patent
Sonehara et al.

(10) Patent No.: US 12,007,626 B2
(45) Date of Patent: Jun. 11, 2024

(54) SPECTACLE LENS AND METHOD FOR DESIGNING THE SAME

(71) Applicant: HOYA LENS THAILAND LTD., Pathumthani (TH)

(72) Inventors: Toshiaki Sonehara, Tokyo (JP); Hua Qi, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 478 days.

(21) Appl. No.: 17/423,317

(22) PCT Filed: Jun. 18, 2020

(86) PCT No.: PCT/JP2020/025119
§ 371 (c)(1),
(2) Date: Jul. 15, 2021

(87) PCT Pub. No.: WO2020/262570
PCT Pub. Date: Dec. 30, 2020

(65) Prior Publication Data
US 2022/0121038 A1  Apr. 21, 2022

(30) Foreign Application Priority Data

Jun. 25, 2019  (JP) ................................. 2019-117842

(51) Int. Cl.
*G02C 7/02*  (2006.01)
(52) U.S. Cl.
CPC ............. *G02C 7/022* (2013.01); *G02C 7/024* (2013.01); *G02C 2202/24* (2013.01)
(58) Field of Classification Search
CPC .......... G02C 7/022; G02C 7/024; G02C 7/06; G02C 2202/24
(Continued)

(56) References Cited

U.S. PATENT DOCUMENTS

2005/0105047 A1  5/2005  Smith et al.
2009/0257026 A1* 10/2009  Varnas .................. G02C 7/063
                                                          351/200
(Continued)

FOREIGN PATENT DOCUMENTS

CN    102007444 A    4/2011
CN    104678572 A    6/2015
(Continued)

OTHER PUBLICATIONS

PCT/JP2020/025119, "English Translation of International Search Report", Aug. 10, 2020, 3 pages.

*Primary Examiner* — William R Alexander
(74) *Attorney, Agent, or Firm* — Kilpatrick Townsend & Stockton LLP

(57) ABSTRACT

An object is to not lose an effect of suppressing the progression of myopia or hyperopia even in a peripheral area of a spectacle lens. A spectacle lens and a technology related thereto are provided, the spectacle lens including: a first area that causes light rays incident on an object-side face of the lens to exit from an eyeball-side face of the lens and to converge at a predetermined position A on a retina of a wearer; and a plurality of second areas configured to cause light rays to converge at a position B on the object side or a position C on the distal side relative to the position A, wherein, in the first area in a peripheral area of the spectacle lens that is a radius range from 4.5 mm to 25 mm of a lens center, a refractive power error in a meridional direction and a refractive power error in a sagittal direction have values that cause light rays to converge in a direction extending from a vicinity of the position A toward the position B if the second areas cause the light rays to converge at the position B, or have values that cause light rays to converge in a direction extending from the vicinity of the position A (Continued)

toward the position C if the second areas cause the light rays to converge at the position C.

6 Claims, 21 Drawing Sheets

(58) Field of Classification Search
USPC .................................................. 351/159.01
See application file for complete search history.

(56) References Cited

U.S. PATENT DOCUMENTS

| | | | |
|---|---|---|---|
| 2011/0032474 A1* | 2/2011 | Lindacher | G02C 7/04 |
| | | | 351/159.06 |
| 2011/0051079 A1 | 3/2011 | Martinez et al. | |
| 2017/0131567 A1 | 5/2017 | To et al. | |
| 2017/0184875 A1 | 6/2017 | Newman | |
| 2018/0275427 A1* | 9/2018 | Lau | G02C 7/04 |
| 2020/0073147 A1 | 3/2020 | Bakaraju et al. | |
| 2021/0282966 A1* | 9/2021 | Back | A61F 9/0017 |

FOREIGN PATENT DOCUMENTS

| | | |
|---|---|---|
| CN | 208969368 U | 6/2019 |
| WO | 2018076057 A1 | 5/2018 |

\* cited by examiner

[Fig.1A]
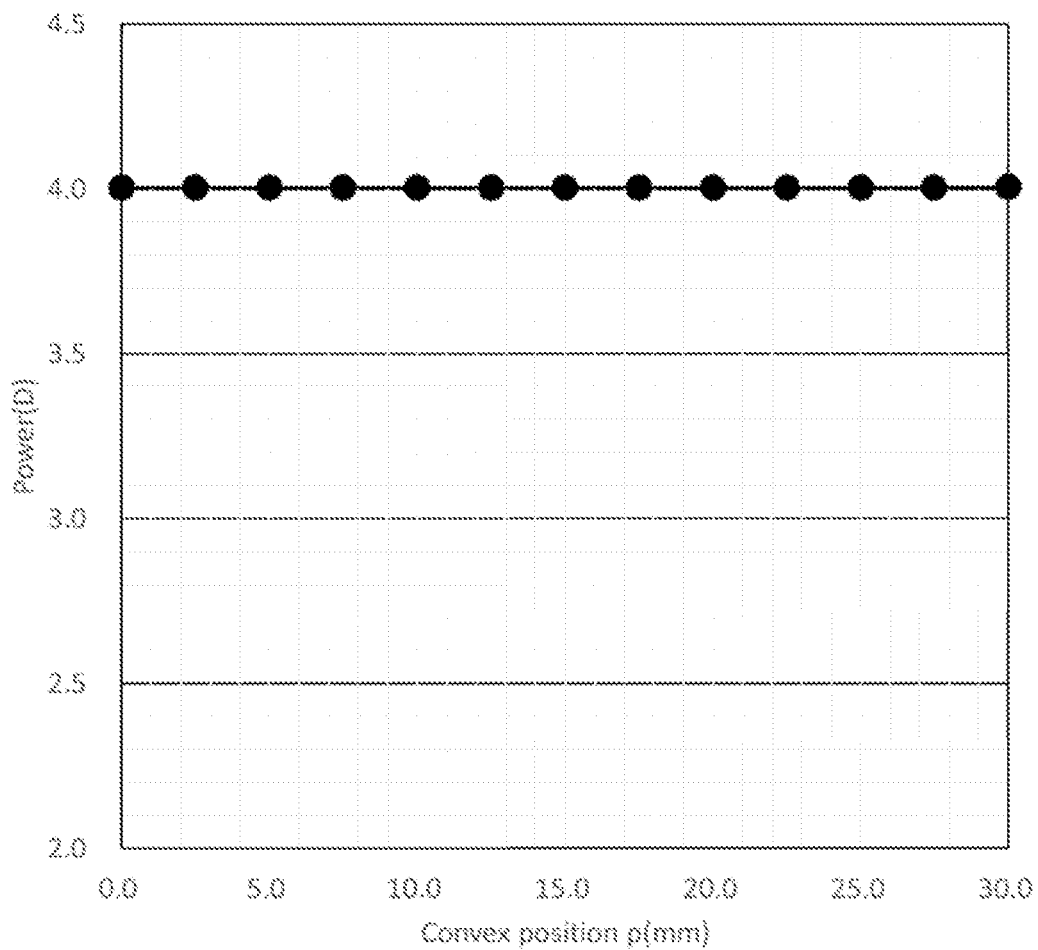

[Fig.1B]
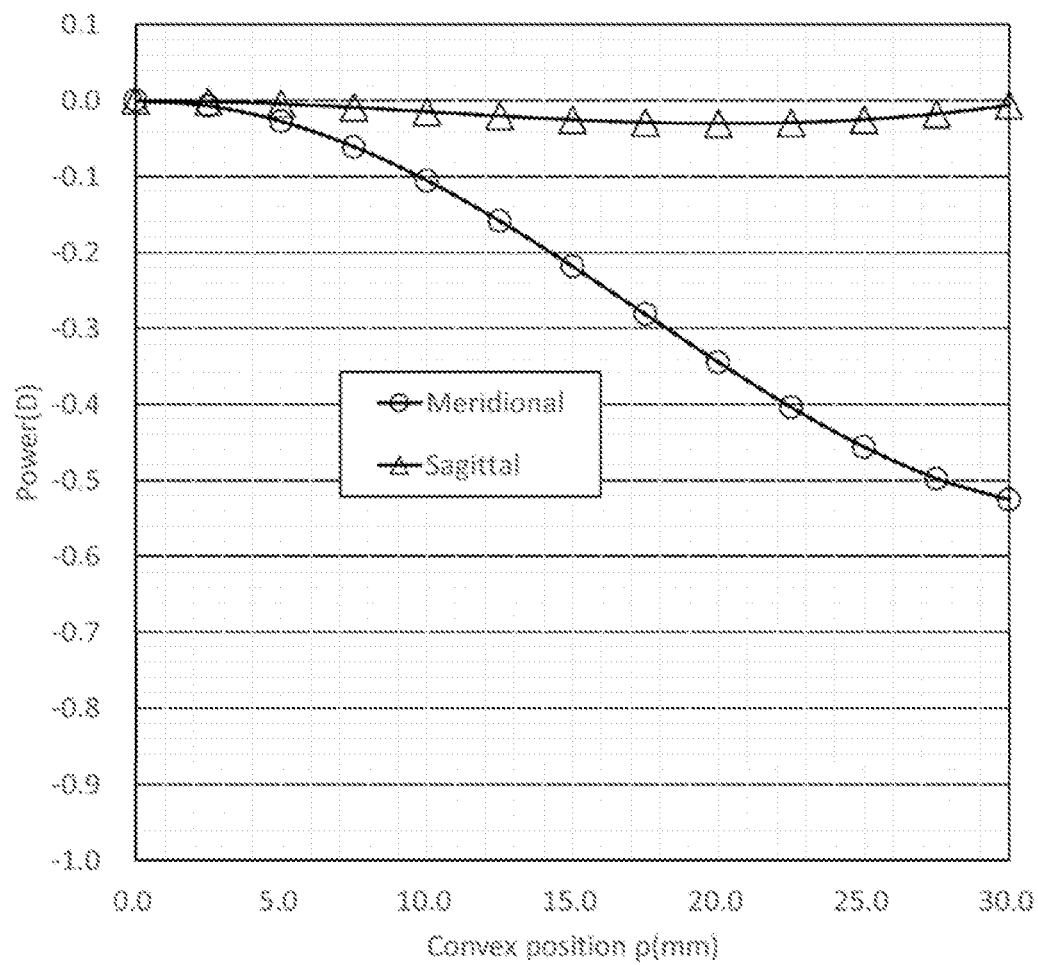

[Fig.2]
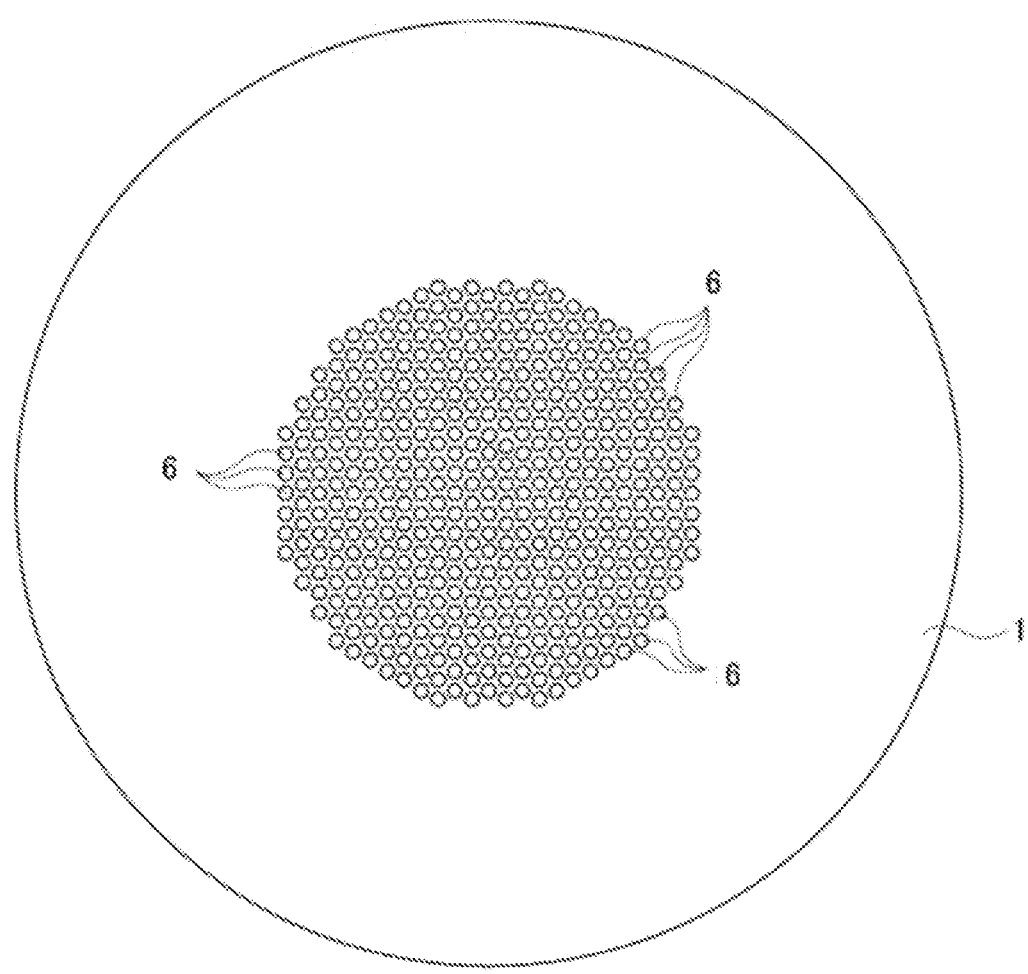

[Fig.3]
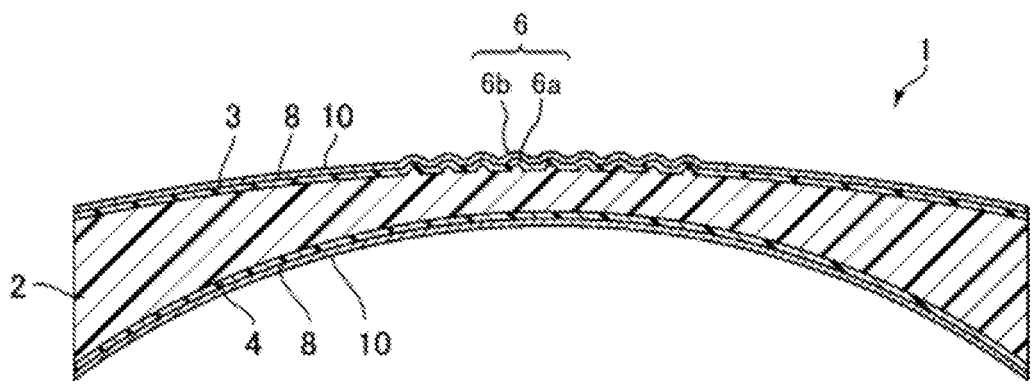
[Fig.4]
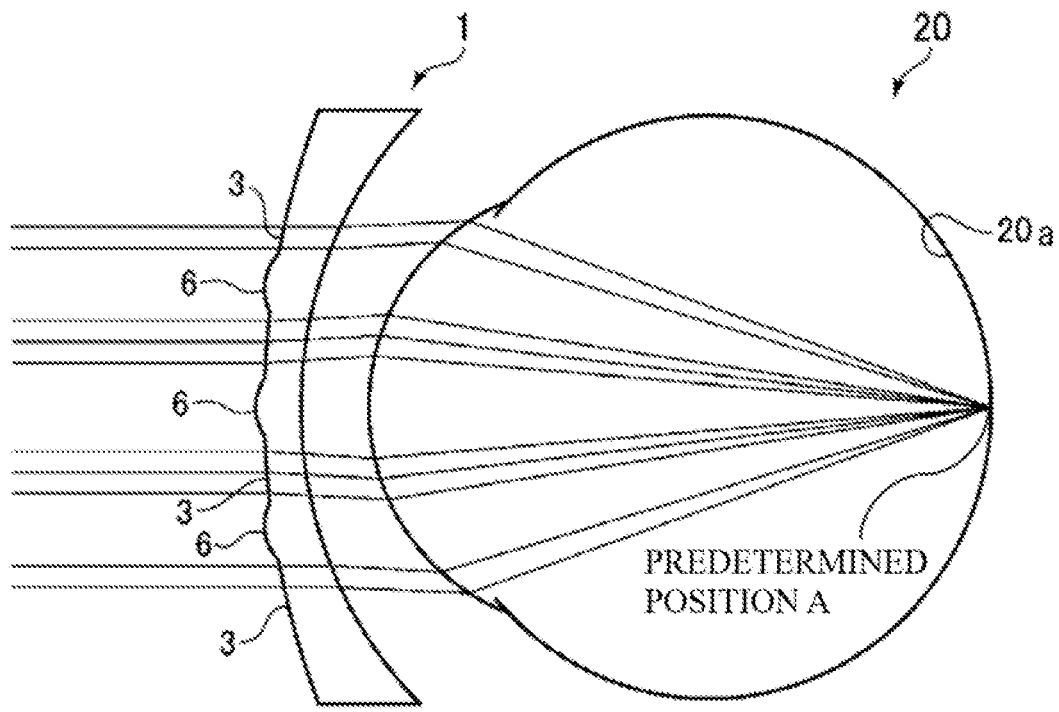

[Fig.5]
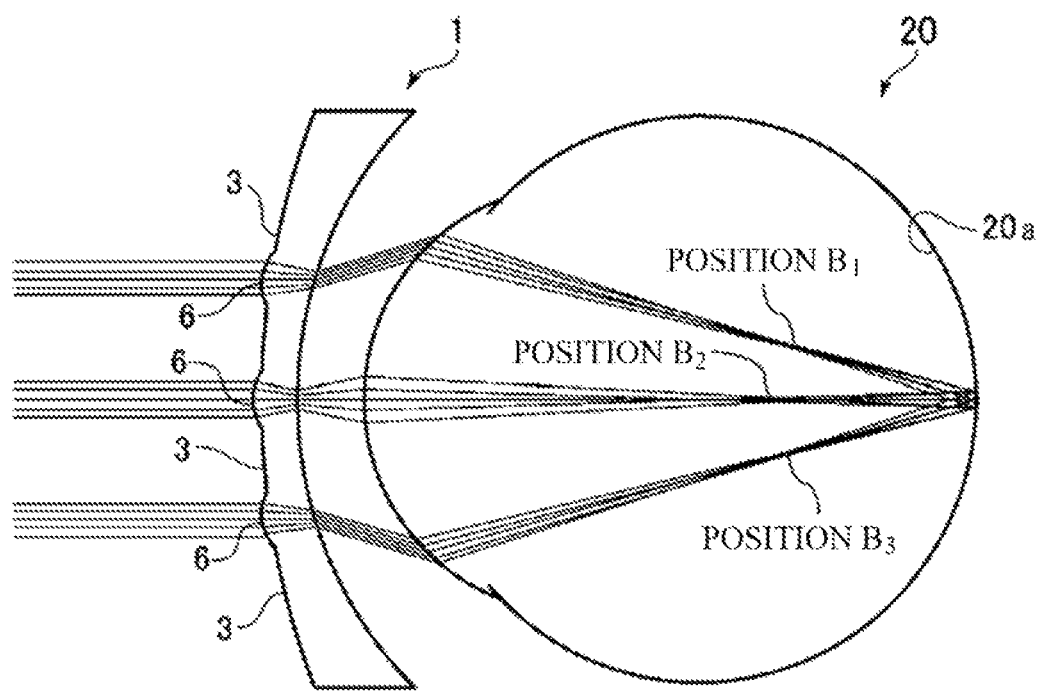

[Fig.6A]
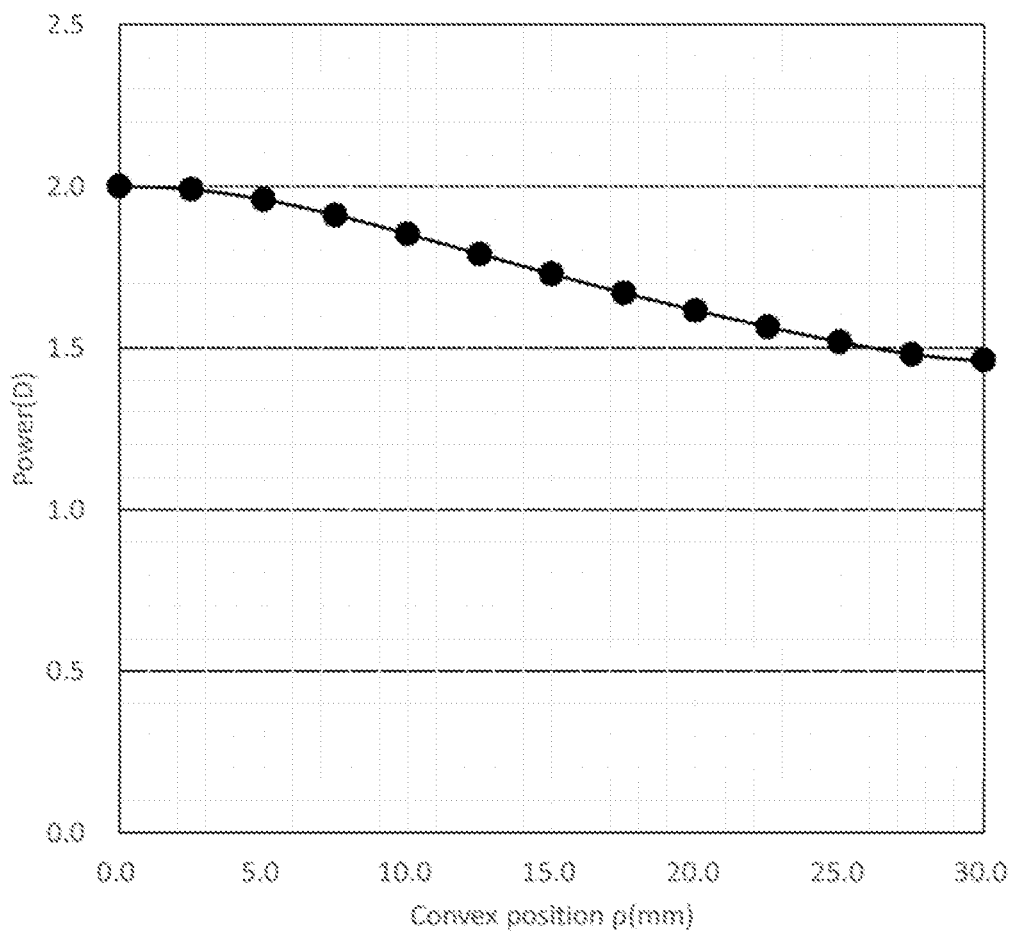

[Fig.6B]
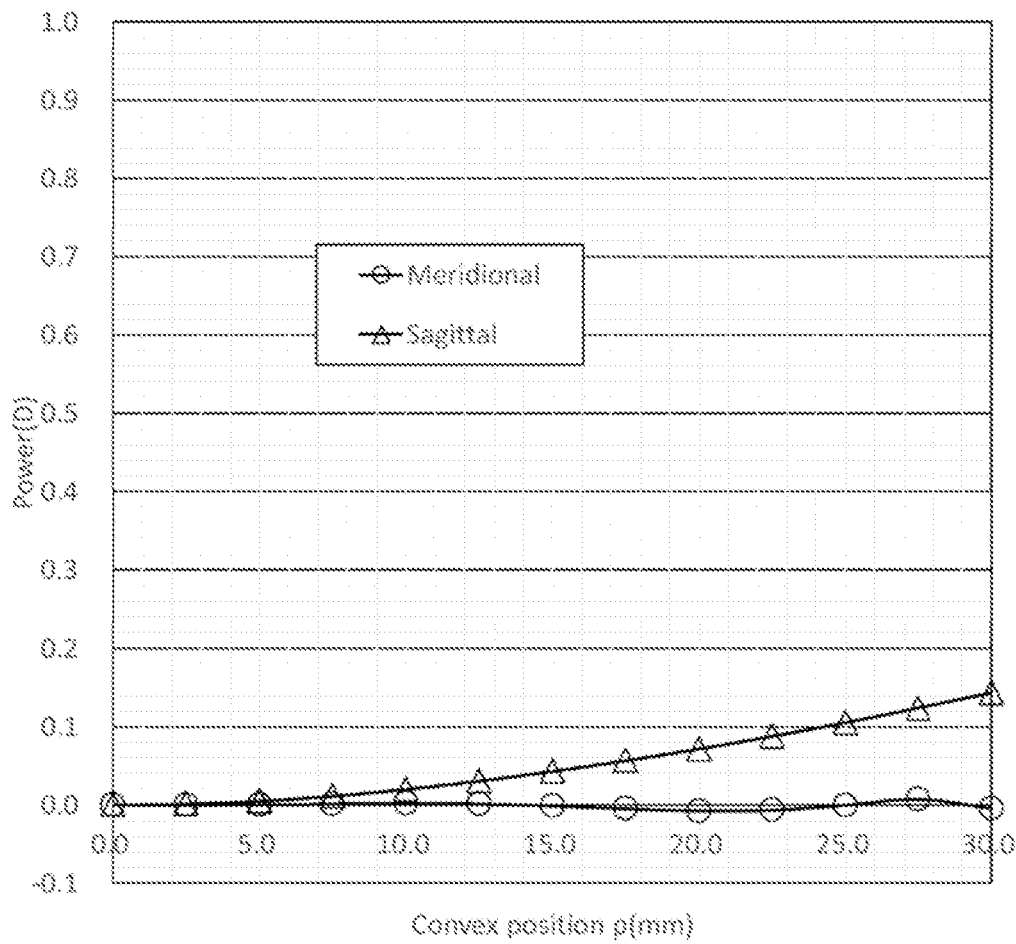

[Fig.7A]
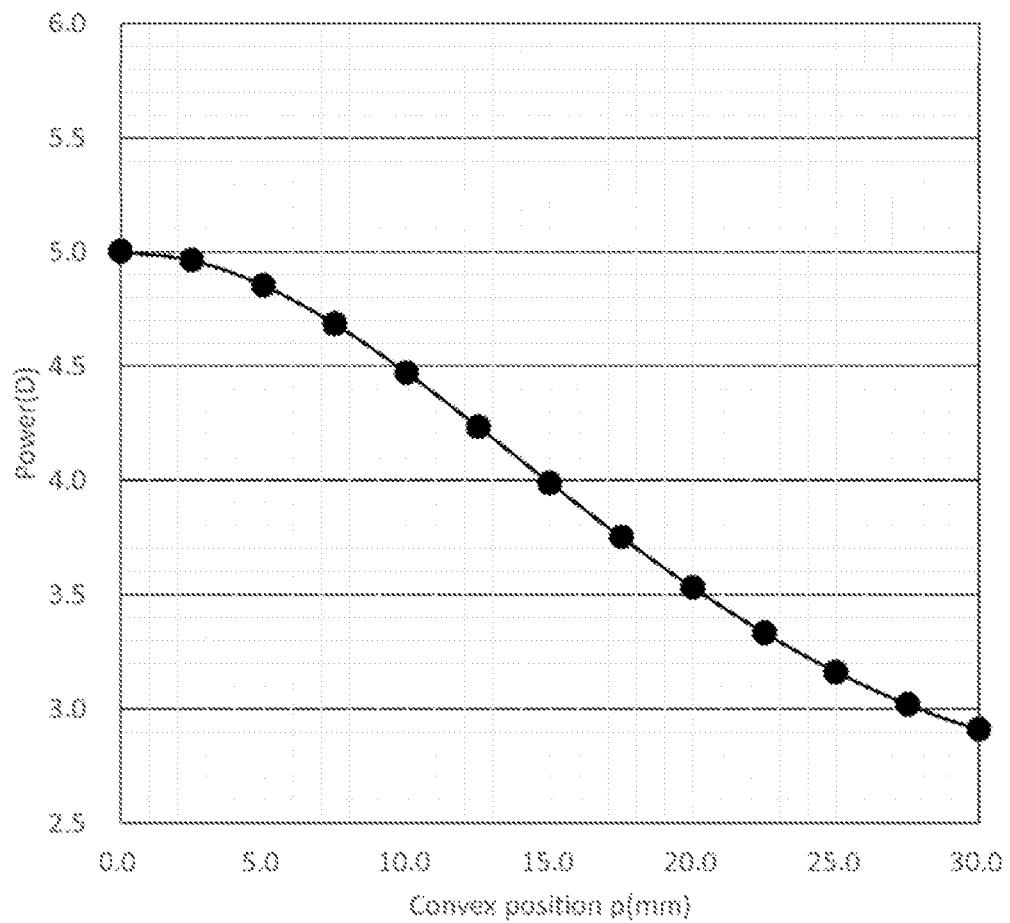

[Fig.7B]
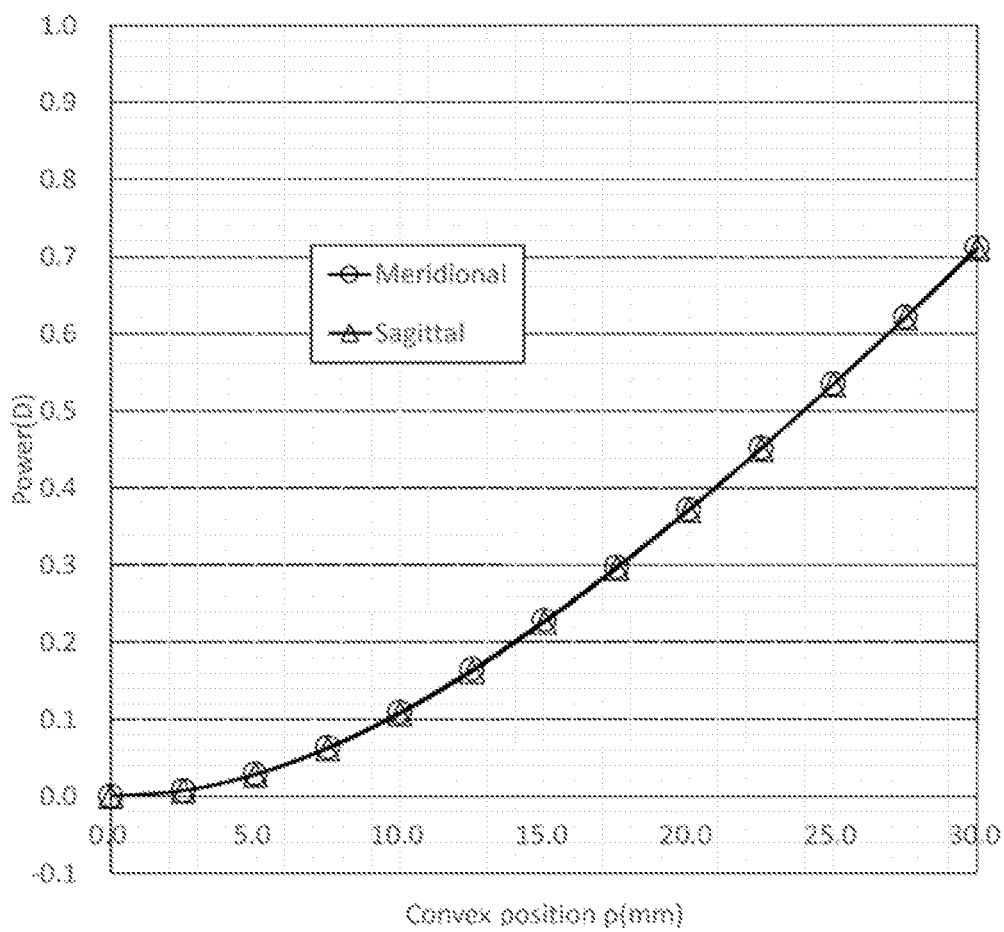

[Fig.8A]
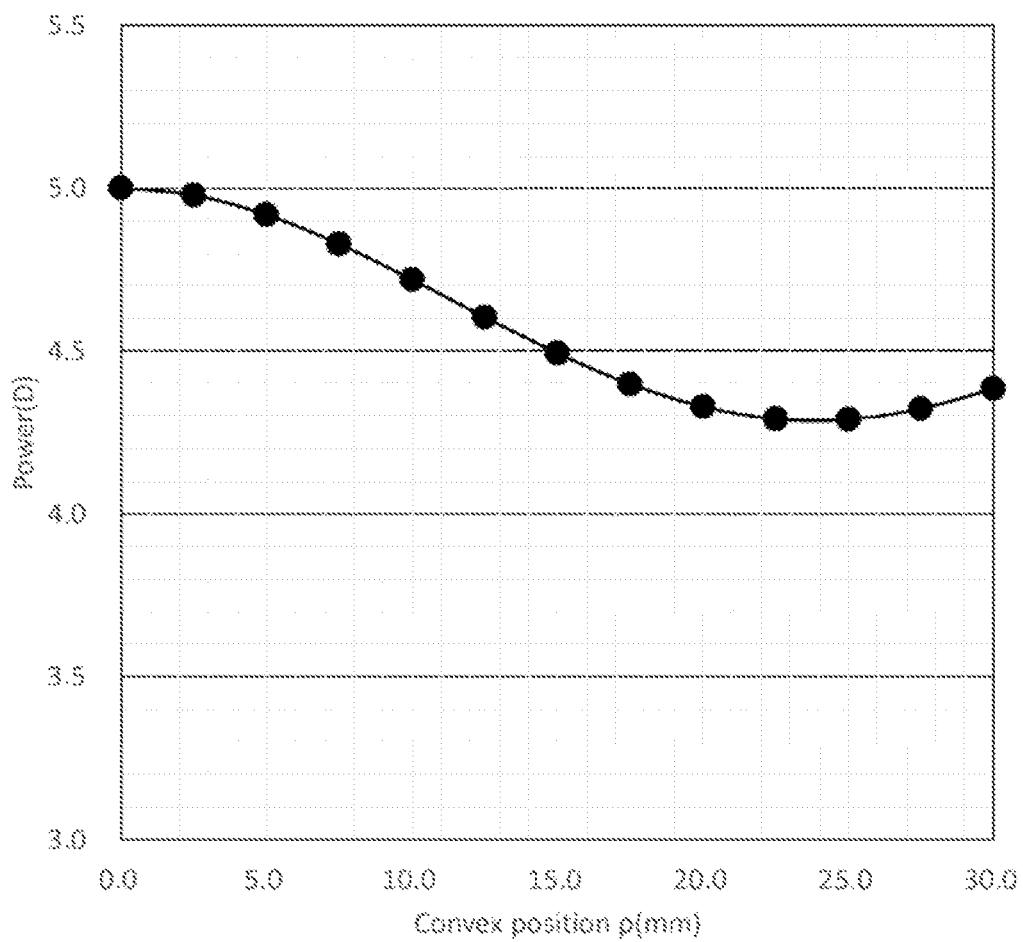

[Fig.8B]
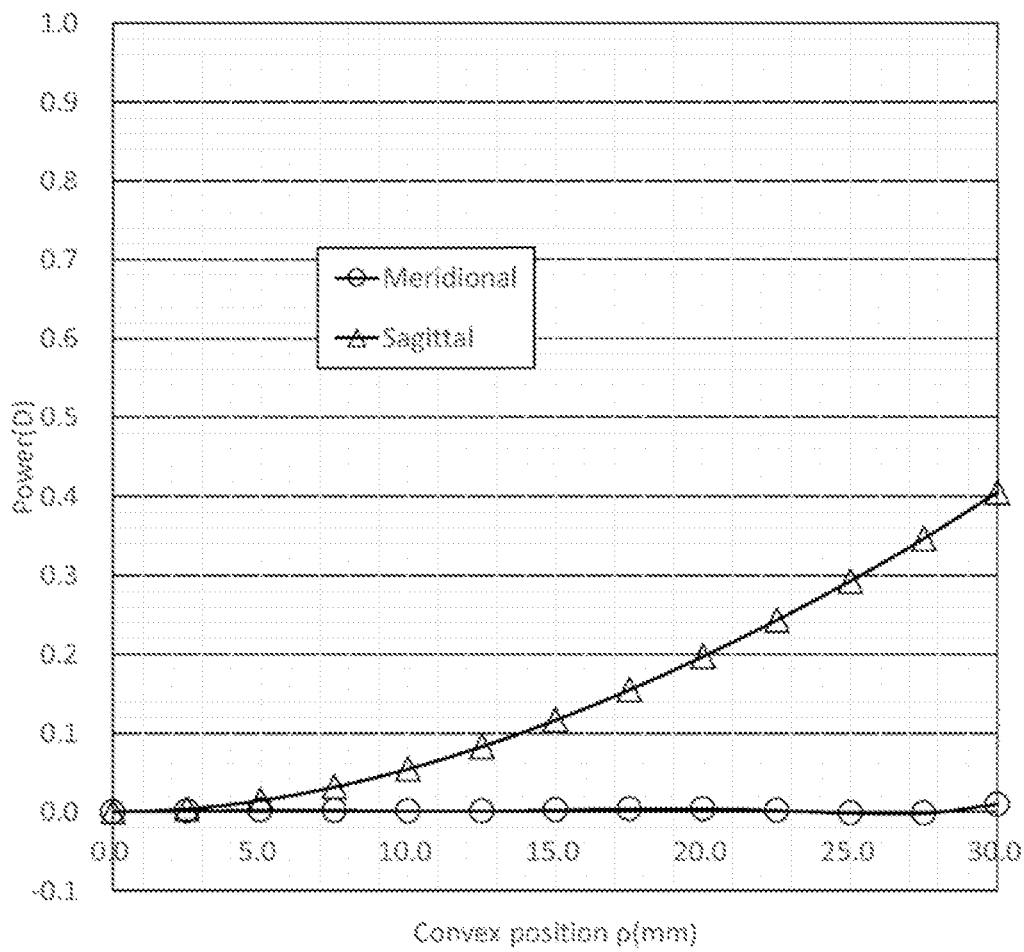

[Fig.9A]
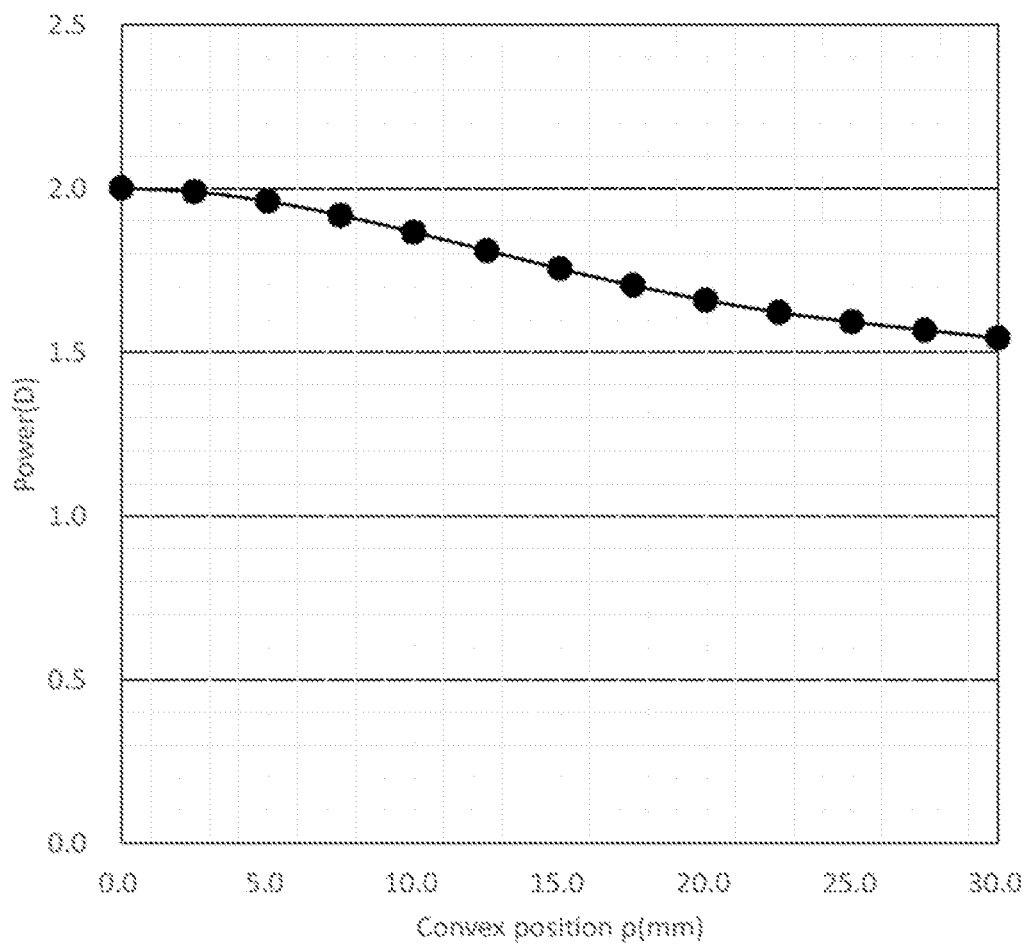

[Fig.9B]
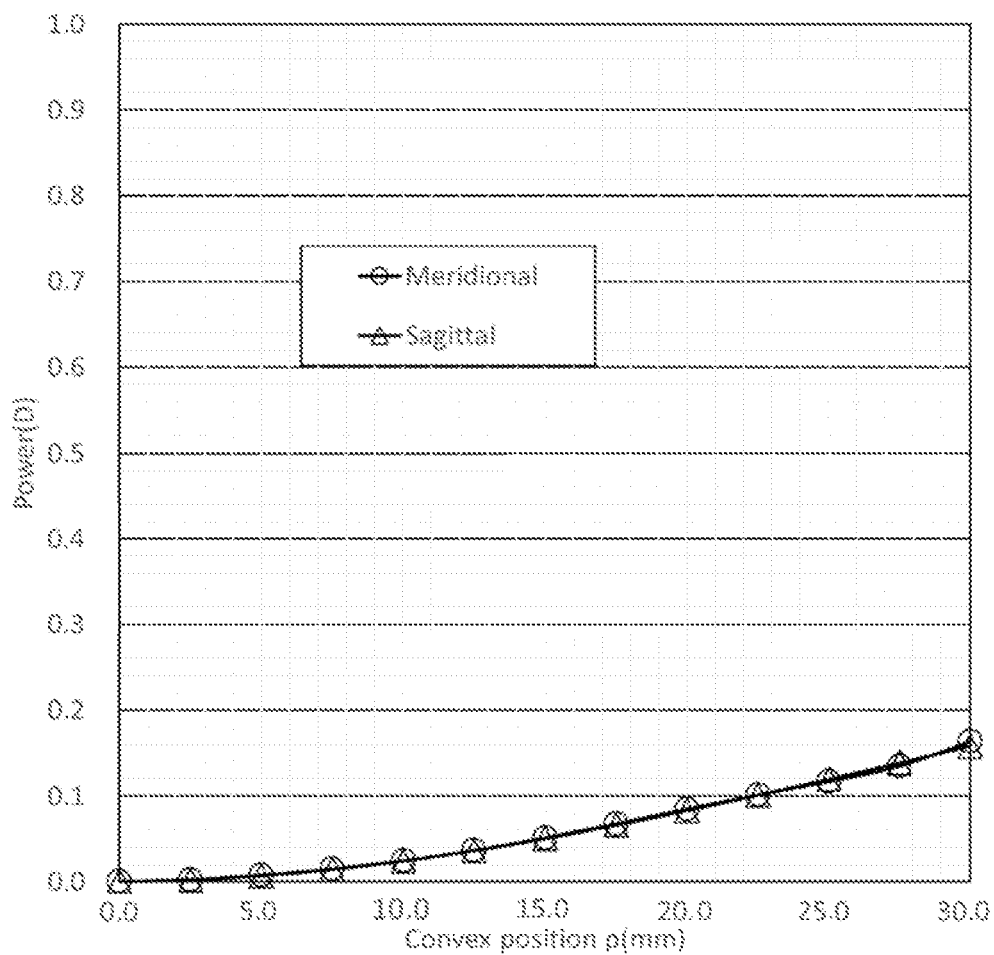

[Fig.10A]
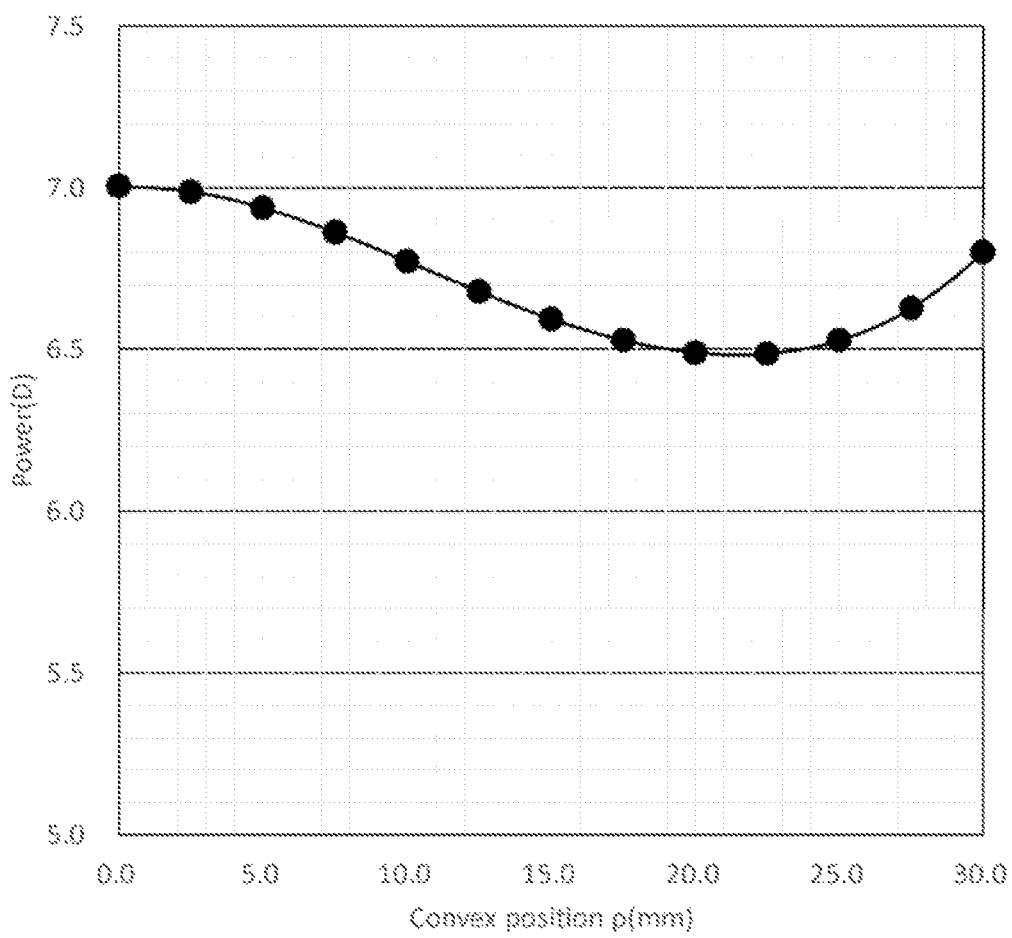

[Fig.10B]
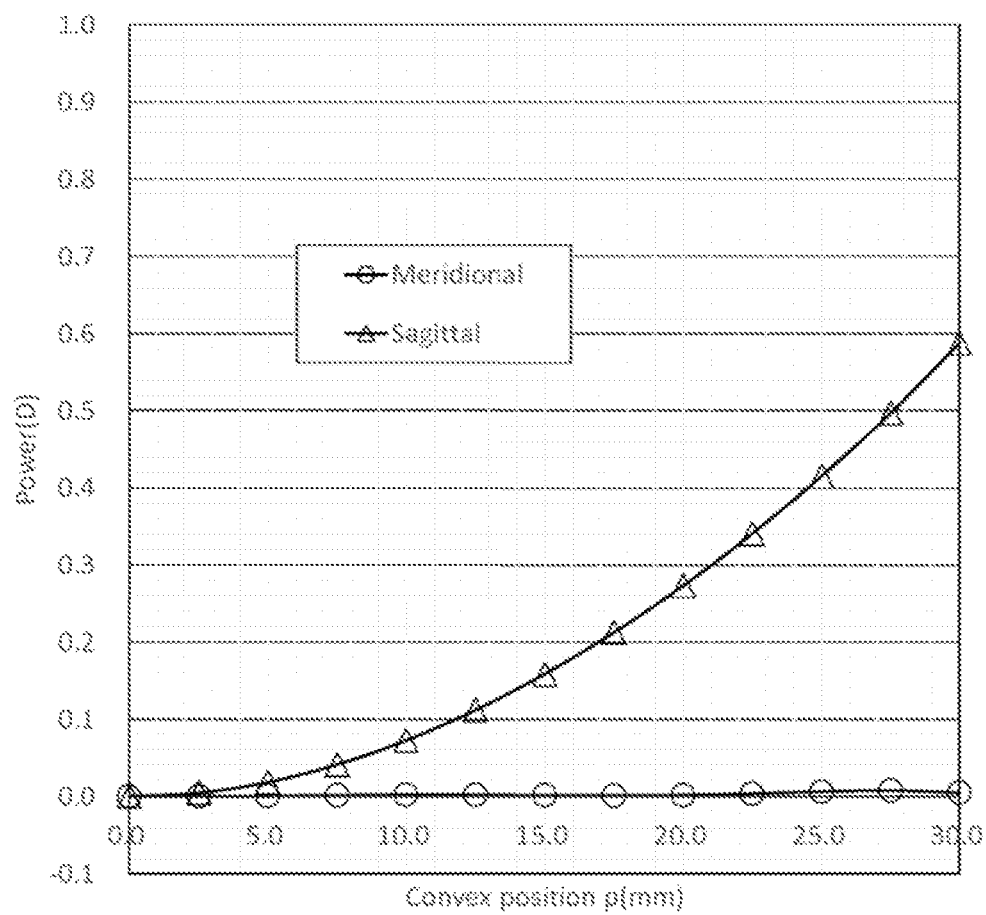

[Fig.11A]
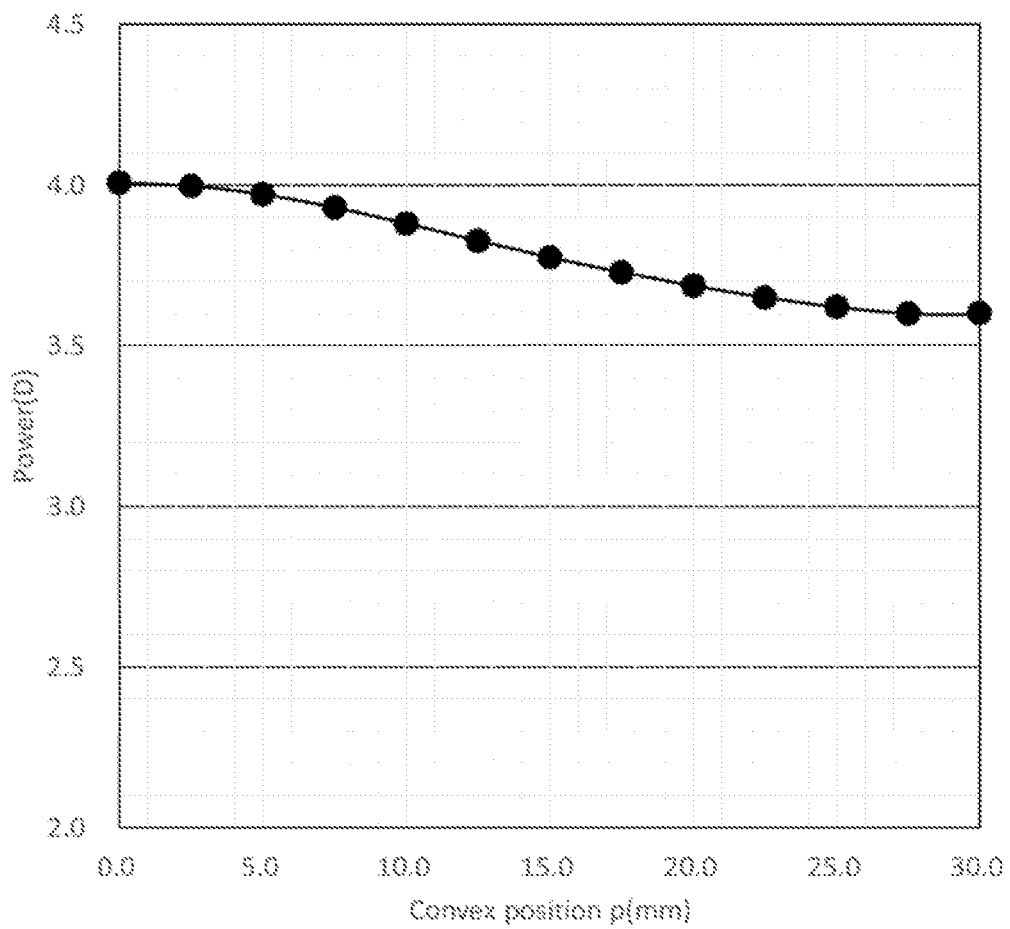

[Fig.11B]
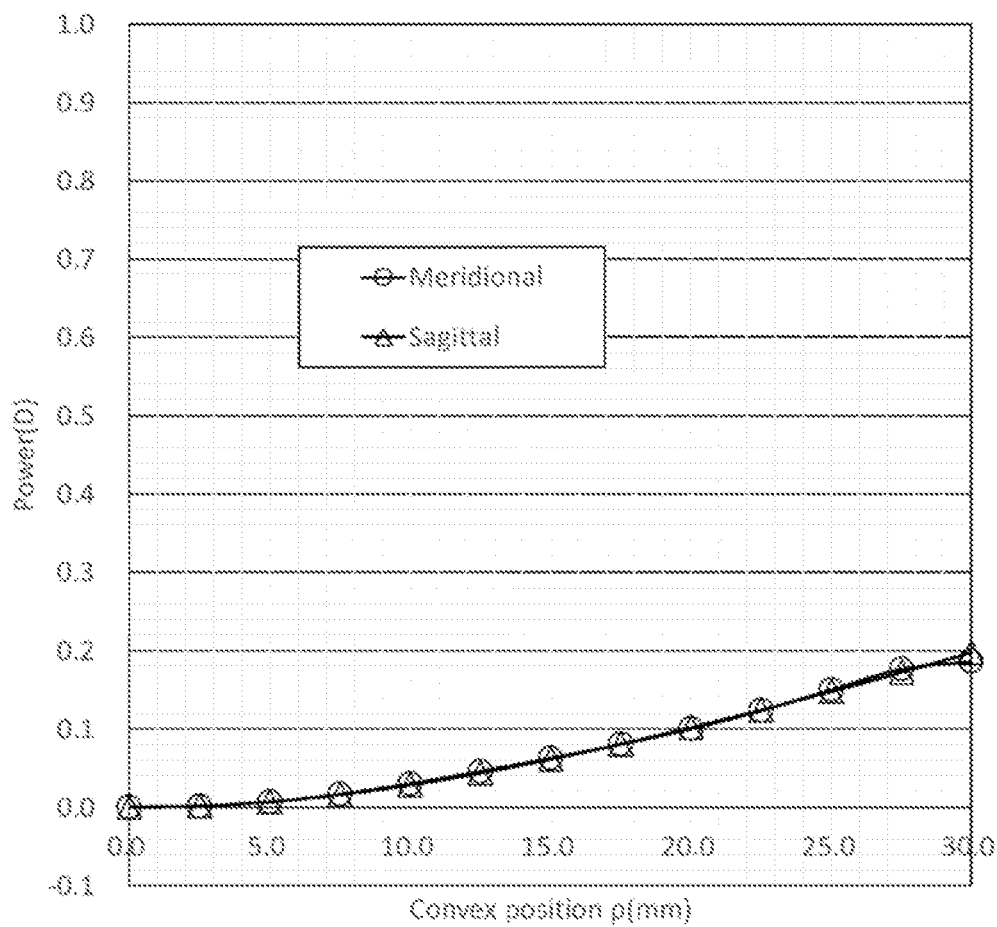

[Fig.12A]
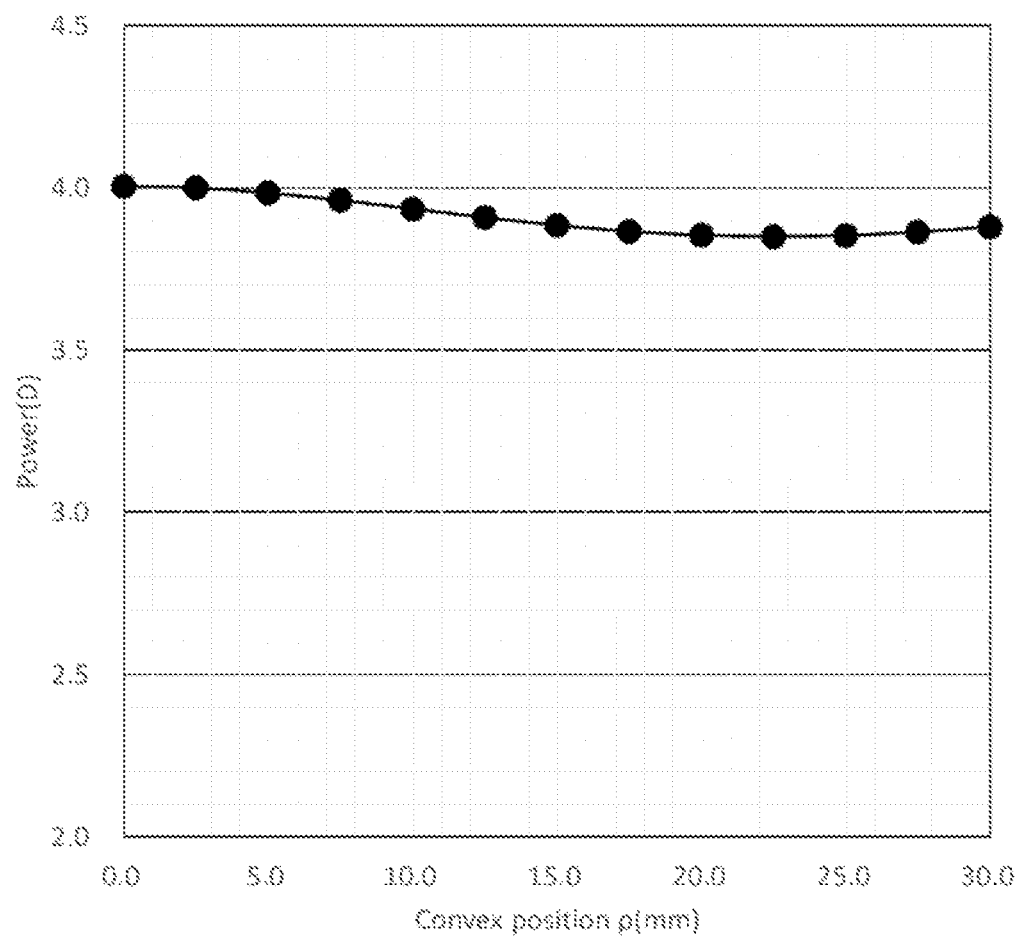

[Fig.12B]
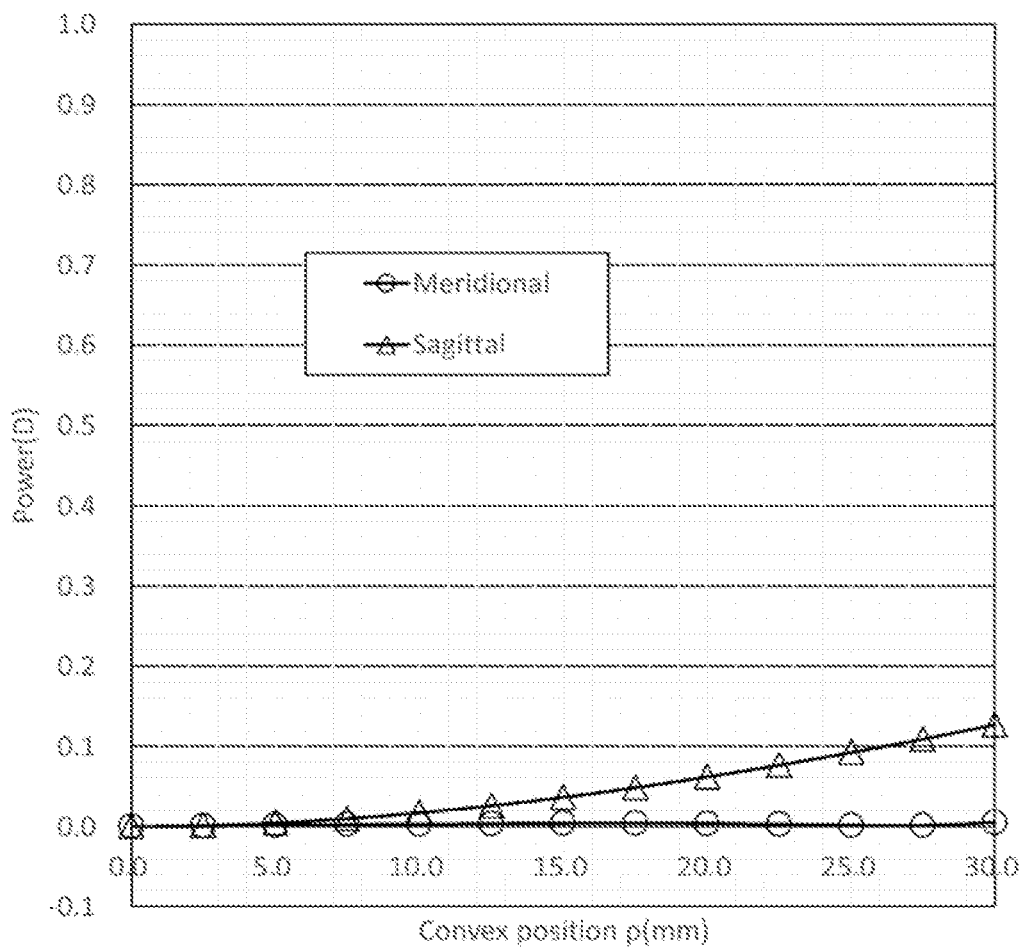

[Fig.13A]
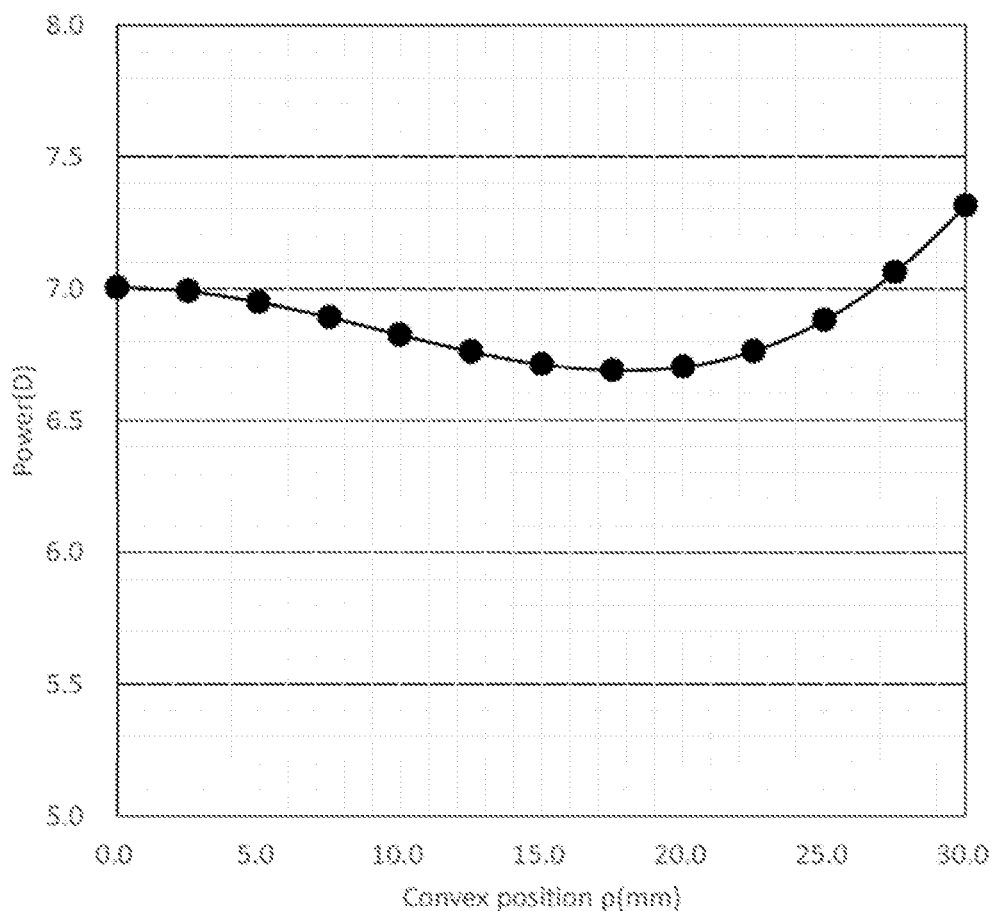

[Fig.13B]
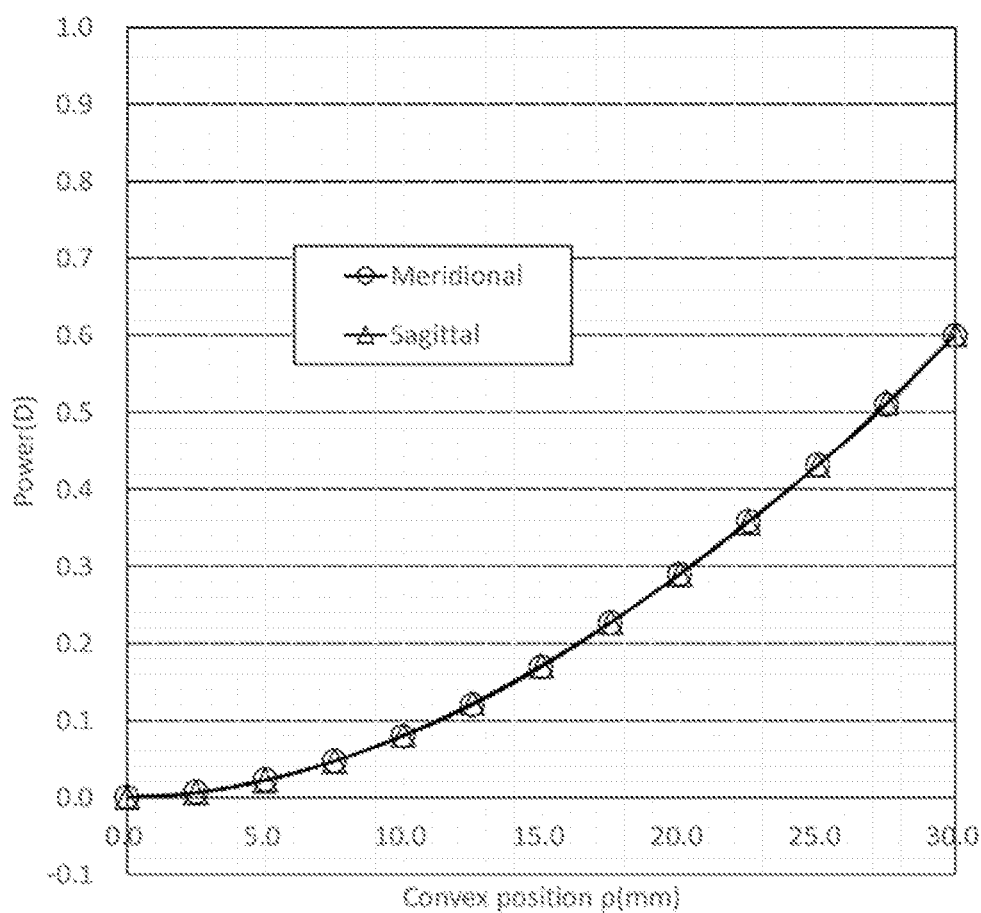

SPECTACLE LENS AND METHOD FOR DESIGNING THE SAME

CROSS-REFERENCE TO RELATED APPLICATIONS

This application is the National Stage of International Application No. PCT/JP2020/025119, filed Jun. 18, 2020, which claims priority to Japanese Patent Application No. 2019-117842, filed Jun. 25, 2019, and the contents of which is incorporated by reference.

TECHNICAL FIELD

The present disclosure relates to a spectacle lens and a method for designing the same, and relates particularly to a myopia progression-suppressive lens and a method for designing the same.

BACKGROUND ART

In a spectacle lens, ordinarily, parallel rays that are incident on the object-side face of the lens exit from the eyeball-side face of the lens and are focused on the retina (in the present specification, at a predetermined position A) of the wearer. That is to say, the parallel rays from a portion of a spectacle lens with a shape that corresponds to a prescription power are focused on the retina. This position A will be referred to as a focal position A.

CITATION LIST

Patent Literature

US 2017/131567A is an example of related art.

Astigmatism and a power error occur at a portion distant from the optical center (or centroid) (hereinafter also referred to collectively as the "lens center") of a spectacle lens. The occurrence of astigmatism and a power error means that a refractive power error occurs with respect to the prescription power. This refractive power error is expressed as (transmission power−prescription power). Thus, in the present specification, a refractive power error refers to a transmission power error, unless otherwise stated. Also, the occurrence of astigmatism and a power error means that a refractive power error in the meridional direction and a refractive power error in the sagittal direction that are the bases of the refractive power error occur.

SUMMARY OF THE DISCLOSURE

A first mode of the present disclosure is a spectacle lens including:
- a first area that causes light rays incident on an object-side face of the lens to exit from an eyeball-side face of the lens and to converge at a predetermined position A on a retina of a wearer; and
- a plurality of second areas configured to cause light rays to converge at a position B on the object side or a position C on the distal side relative to the position A, wherein, in the first area in a peripheral area of the spectacle lens that is a radius range from 4.5 mm to 25 mm of a lens center, a refractive power error in a meridional direction and a refractive power error in a sagittal direction have values that cause light rays to converge in a direction extending from a vicinity of the position A toward the position B if the second areas cause the light rays to converge at the position B, or have values that cause light rays to converge in a direction extending from the vicinity of the position A toward the position C if the second areas cause the light rays to converge at the position C.

A second mode of the present disclosure is the mode described as the first mode, in which
- the second areas are convex areas, and
- in the first area in the peripheral area, both the refractive power error in the meridional direction and the refractive power error in the sagittal direction are −0.25 D or more.

A third mode of the present disclosure is the mode described as the first or second mode, in which
- the second areas are convex areas, and
- the refractive power error in the meridional direction or the refractive power error in the sagittal direction is −0.12 D or more and +0.12 D or less, and takes a value lower than a value of the other refractive power error.

A fourth mode of the present disclosure is the mode described as any of the first to third mode, in which
- the refractive power error in the meridional direction or the refractive power error in the sagittal direction takes a value obtained by performing ray tracing at a finite distance.

A fifth mode of the present disclosure is a method for designing a spectacle lens that includes:
- a first area that causes light rays incident on an object-side face of the lens to exit from an eyeball-side face of the lens and to converge at a predetermined position A on a retina of a wearer; and
- a plurality of second areas configured to cause light rays to converge at a position B on the object side or a position C on the distal side relative to the position A, the method including:
- setting, in the first area in a peripheral area of the spectacle lens that is a radius range from 4.5 mm to 25 mm of a lens center, a refractive power error in a meridional direction and a refractive power error in a sagittal direction to values that cause light rays to converge in a direction extending from a vicinity of the position A toward the position B if the second areas cause the light rays to converge at the position B, or to values that cause light rays to converge in a direction extending from the vicinity of the position A toward the position C if the second areas cause the light rays to converge at the position C.

A sixth mode of the present disclosure is the mode described as the fifth mode, in which
- the second areas are convex areas, and
- in the first area in the peripheral area, both the refractive power error in the meridional direction and the refractive power error in the sagittal direction are −0.25 D or more.

BRIEF DESCRIPTION OF THE DRAWINGS

FIG. 1A is a plot showing the relationship between the distance from the lens center (horizontal axis) and surface refractive power on a lens inner face (aspherical) in the later-described Comparative Example 1 (vertical axis).

FIG. 1B is a plot showing the relationship between the distance from the lens center (horizontal axis) and a transmission power error in the meridional direction and a transmission power error in the sagittal direction in a first area (base portion) of a spectacle lens in the later-described Comparative Example 1 (vertical axis).

FIG. 2 is a front elevational view showing the shape of a spectacle lens according to a mode of the present disclosure.

FIG. 3 is a cross-sectional view showing an example configuration of the spectacle lens shown in FIG. 2.

FIG. 4 is a schematic cross-sectional view (part 1) showing paths of light that is transmitted through the spectacle lens shown in FIG. 2.

FIG. 5 is a schematic cross-sectional view (part 2) showing paths of light that is transmitted through the spectacle lens shown in FIG. 2.

FIG. 6A is a plot showing the relationship between the distance from the lens center (horizontal axis) and surface refractive power on a lens inner face (aspherical face) in Embodiment 1 (vertical axis).

FIG. 6B is a plot showing the relationship between the distance from the lens center (horizontal axis) and a transmission power error in the meridional direction and a transmission power error in the sagittal direction in a first area (base portion) of a spectacle lens in Embodiment 1 (vertical axis).

FIG. 7A is a plot showing the relationship between the distance from the lens center (horizontal axis) and surface refractive power on a lens inner face (aspherical face) in Embodiment 2 (vertical axis).

FIG. 7B is a plot showing the relationship between the distance from the lens center (horizontal axis) and a transmission power error in the meridional direction and a transmission power error in the sagittal direction in a first area (base portion) of a spectacle lens in Embodiment 2 (vertical axis).

FIG. 8A is a plot showing the relationship between the distance from the lens center (horizontal axis) and surface refractive power on a lens inner face (aspherical face) in Embodiment 3 (vertical axis).

FIG. 8B is a plot showing the relationship between the distance from the lens center (horizontal axis) and a transmission power error in the meridional direction and a transmission power error in the sagittal direction in a first area (base portion) of a spectacle lens in Embodiment 3 (vertical axis).

FIG. 9A is a plot showing the relationship between the distance from the lens center (horizontal axis) and surface refractive power on a lens inner face (aspherical face) in Embodiment 4 (vertical axis).

FIG. 9B is a plot showing the relationship between the distance from the lens center (horizontal axis) and a transmission power error in the meridional direction and a transmission power error in the sagittal direction in a first area (base portion) of a spectacle lens in Embodiment 4 (vertical axis).

FIG. 10A is a plot showing the relationship between the distance from the lens center (horizontal axis) and surface refractive power on a lens inner face (aspherical face) in Embodiment 5 (vertical axis).

FIG. 10B is a plot showing the relationship between the distance from the lens center (horizontal axis) and a transmission power error in the meridional direction and a transmission power error in the sagittal direction in a first area (base portion) of a spectacle lens in Embodiment 5 (vertical axis).

FIG. 11A is a plot showing the relationship between the distance from the lens center (horizontal axis) and surface refractive power on a lens inner face (aspherical face) in Embodiment 6 (vertical axis).

FIG. 11B is a plot showing the relationship between the distance from the lens center (horizontal axis) and a transmission power error in the meridional direction and a transmission power error in the sagittal direction in a first area (base portion) of a spectacle lens in Embodiment 6 (vertical axis).

FIG. 12A is a plot showing the relationship between the distance from the lens center (horizontal axis) and surface refractive power on a lens inner face (aspherical face) in Embodiment 7 (vertical axis).

FIG. 12B is a plot showing the relationship between the distance from the lens center (horizontal axis) and a transmission power error in the meridional direction and a transmission power error in the sagittal direction in a first area (base portion) of a spectacle lens in Embodiment 7 (vertical axis).

FIG. 13A is a plot showing the relationship between the distance from the lens center (horizontal axis) and surface refractive power on a lens inner face (aspherical face) in Embodiment 8 (vertical axis).

FIG. 13B is a plot showing the relationship between the distance from the lens center (horizontal axis) and a transmission power error in the meridional direction and a transmission power error in the sagittal direction in a first area (base portion) of a spectacle lens in Embodiment 8 (vertical axis).

EMBODIMENTS OF THE DISCLOSURE

Patent Document 1 (US Patent Application Publication No. 2017/131567) describes a spectacle lens that exhibits an effect of suppressing the progression of refractive errors such as myopia (hereinafter also referred to as a myopia progression-suppressive effect). This spectacle lens is also referred to as a myopia progression-suppressive lens. Specifically, micro convex portions, each of which has a spherical shape with a diameter of approximately 1 mm, for example, are formed on a convex face, which is a face on an object side of a spectacle lens.

In a spectacle lens, ordinarily, parallel rays that are incident on the object-side face of the lens exit from the eyeball-side face of the lens and are focused on the retina (in the present specification, at a predetermined position A) of the wearer. That is to say, the parallel rays from a portion of a spectacle lens with a shape that corresponds to a prescription power (a portion of a spectacle lens as described in Patent Document 1, for example) are focused on the retina. This position A will be referred to as a focal position A. Meanwhile, as for the light that has passed through the micro convex portions of the spectacle lens described in Patent Document 1, light rays incident on the spectacle lens are focused at a plurality of positions B on the object side, in the optical axis direction, relative to the predetermined position A. These positions B will be referred to as focal positions B. The progression of myopia is suppressed by defocusing power imparted by the micro convex portions.

In the present specification, being on the object side refers to the side in the direction, along the optical axis, of an object to be visually recognized ("the forward direction"), and being on the distal side refers to the side opposite to the object side: i.e., the side in the direction, along the optical axis, that is away from the object ("the rear direction," or the direction from the spectacle lens toward the eyeball).

The spectacle lens described in Patent Document 1 is provided with micro convex portions in order to suppress the progression of myopia, and light rays are focused at a plurality of positions B that are on the object side relative to the position A on the retina, as described in the Background Art (see FIG. 5, which will be described later).

However, a refractive power error in the meridional direction and a refractive power error in the sagittal direction occur at a portion distant from the lens center. It has been revealed, based on research by the inventors of the present application, that these refractive power errors may cause light rays to be focused toward positions C located in the opposite direction relative to the positions B, i.e. located on the distal side (rear direction) relative to the position A on the retina.

Light rays being focused at positions C located in the opposite direction in an area where prescription power is meant to be realized means that the myopia progression-suppressive effect exhibited by the micro convex portions is impaired.

Note that Patent Document 1 states that the myopia progression-suppressive effect is exhibited by the micro convex portions. Meanwhile, a hyperopia progression-suppressive effect is expected to be exhibited by replacing the micro convex portions with micro concave portions, due to a mechanism that is contrary to the myopia progression mechanism and the mechanism that suppresses the myopia progression described in Patent Document 1. In the case of providing micro concave portions as well, a malfunction may occur at a portion distant from the aforementioned lens center, and there is a concern that the hyperopia progression-suppressive effect exhibited by the micro concave portions will be impaired.

An embodiment of the present disclosure aims to not impair the effect of suppressing the progression of myopia or hyperopia even in a peripheral area of a spectacle lens.

The inventors of the present application conducted undertook intense research to solve the foregoing problems. The inventors of the present application first paid attention to the situation in which light rays are focused at positions C located on the opposite side relative to the positions B, i.e. the positions C on the distal side relative to the position A on the retina, at a portion distant from the lens center.

FIG. 1A is a plot showing the relationship between the distance from the lens center (horizontal axis) and surface refractive power on a lens inner face (aspherical) in the later-described Comparative Example 1 (vertical axis).

FIG. 1B is a plot showing the relationship between the distance from the lens center (horizontal axis) and a transmission power error in the meridional direction and a transmission power error in the sagittal direction in a first area (base portion) of a spectacle lens in the later-described Comparative Example 1 (vertical axis).

Note that the meridional direction refers to a direction that is a radius direction extending radially from the lens center, and the sagittal direction refers to a direction perpendicular to the meridional direction. The symbol ρ denotes the distance from the optical axis in the face (convex face; outer face) on the object side.

In the spectacle lens in this example, the refractive power error in the meridional direction increases in the minus direction in a peripheral area of the spectacle lens that is a radius range from 4.5 mm to 25 mm from the lens center, as shown in FIG. 1B. An increase in the refractive power error in the minus direction means that the focal position moves toward the distal side, i.e. in the rear direction.

That is to say, the inventors of the present application found that there is concern that "movement of the focal position in the rear direction", which may inhibit suppression of the progression of myopia, will occur in an area where a prescription power is meant to be realized (the first area in the present specification), on a side distant from the lens center.

Regarding measures for this concern, the refractive power error and astigmatism are in a trade-off relationship (e.g. JP 2012-233959A, paragraphs 0028 and 0029). However, it is possible to control the refractive power error when designing the surface shape of a spectacle lens, if an increase in astigmatism is allowed to a certain extent.

Based on the above-described findings, the inventors of the present application conceived a configuration in which, in the case of aiming to suppress the progression of myopia, for example, even if a refractive power error occurs, the refractive power error is set to a value that does not excessively move the focal position in the rear direction, in the peripheral area of a spectacle lens that is a radius range from 4.5 mm to 25 mm from the lens center.

The present disclosure has been made based on the above-described findings.

According to an embodiment of the present disclosure, it is possible to not impair the effect of suppressing the progression of myopia or hyperopia even in the peripheral area of a spectacle lens.

A mode of the present disclosure will be described below. The following description is an example, and the present disclosure is not limited to the mode described as an example.

Spectacle Lens According to Mode of the Present Disclosure

The spectacle lens according to a mode of the present disclosure is a myopia progression-suppressive lens. General features of the lens may be similar to the spectacle lens described in Patent Document 1. The specific configuration is as follows.

"A spectacle lens including:
a first area that causes light rays incident on an object-side face of the lens to exit from an eyeball-side face of the lens and to converge at a predetermined position A on a retina of a wearer; and
a plurality of second areas configured to cause light rays to converge at a position B on the object side relative to the position A,
wherein, in the first area in a peripheral area of the spectacle lens that is a radius range from 4.5 mm to 25 mm of a lens center, a refractive power error in a meridional direction and a refractive power error in a sagittal direction have values that cause light rays to converge in a direction extending from a vicinity of the position A toward the position B."

The first area corresponds generally to a first refraction area as shown, for example, in Patent Document 1. The "light rays incident from a face on an object side" in the above specific configuration are light rays from an infinite point. The second areas correspond generally to second refraction areas as shown, for example, in Patent Document 1. That is to say, in this mode, the second areas are convex areas.

In a mode of the present disclosure, even if a refractive power error occurs in the peripheral area of the spectacle lens that is a radius range from 4.5 mm to 25 mm from the lens center (hereinafter also referred to simply as a "peripheral area"), a refractive power error in the meridional direction and a refractive power error in the sagittal direction have values that cause light rays to converge in a direction extending from the vicinity of the predetermined position A toward the position B.

Note that the reason for using the term "vicinity" of the predetermined position A, i.e. the reason for allowing an area that is slightly on the distal side (in the rear direction) relative to the predetermined position A is as follows.

The first area in the peripheral area is a portion with a shape that realizes a prescription power. For this reason, preferably, light rays are to be converged at the predetermined position A on the retina. However, the refractive power error is made zero under a predetermined condition, and if this condition falls slightly short of being satisfied, a small refractive power error may occur. Also, in the actual designing process, it is not realistic to aim to make the refractive power error exactly zero, and usually, it is aimed to set the refractive power error within a predetermined range. For this reason, it is reasonable to allow a refractive power error in the peripheral area to a certain degree.

In a mode of the present disclosure, one of the remarkable characteristics is that, even if a refractive power error is allowed, the first area in the peripheral area is designed so as to not inhibit the myopia progression-suppressive effect.

If the refractive power takes a value deviated from a prescription refractive power, i.e. an error occurs in the refractive power in the first area in the peripheral area, it is considered that the growth of the eyeball is promoted or suppressed. It is considered that the promoting power or the suppressive power is proportional to the refractive power. Accordingly, if only a very small fraction of the refractive power error is left only slightly remains, it can be said that the influence thereof on the suppression of the progression of myopia is small.

Regarding the "slight movement of the focal position" to be allowed, for example, it can be considered that both the refractive power error in the meridional direction and the refractive power error in the sagittal direction are −0.25 D (diopters) or more (preferably −0.12 D or more, or more preferably 0 D or more).

By employing the above-described configuration, light rays can be suppressed from being focused toward the position C located in the opposite direction relative to the position B, i.e. on the distal side relative to the vicinity of the position A on the retina, even at a portion distant from the optical center or geometric center that is the lens center.

As a result, according to a mode of the present disclosure, the effect of suppressing the progression of myopia or hyperopia is not impaired even in the peripheral area of the spectacle lens.

Details of Spectacle Lens According to Mode of the Present Disclosure

Hereinafter, a description will be given of more specific examples, examples that may be desired, and modifications of a mode of the present disclosure.

As shown in FIG. 6B according to the later-described Embodiment 1, it may be desired that the refractive power error in the meridional direction or the refractive power error in the sagittal direction is −0.12 D or more and +0.12 D or less, and takes a value lower than the value of the other refractive power error.

In the example shown in FIG. 6B, the refractive power error in the meridional direction is set to −0.12 D or more and +0.12 D or less (more specifically, 0 D or more). That is to say, the refractive power error is made substantially zero, i.e. the prescription power is realized in the meridional direction, even in the peripheral area of the spectacle lens. In this case, the wearer can obtain a clearer field of view than in the case where both the refractive power error in the meridional direction and the refractive power error in the sagittal direction take values deviated from zero.

In addition, as shown in FIG. 6B, light rays can be converged in a direction toward the positions B relative to the predetermined position A by setting, in the peripheral area, the refractive power error in the sagittal direction greater than the refractive power error in the meridional direction that is set as described in the previous paragraph.

That is to say, the spectacle lens according to such a mode of the present disclosure allows a wearer to benefit from the myopia progression-suppressive effect while also being provided with a clear field of view, compared with a conventional spectacle lens.

It may also be desired that the refractive power error in the meridional direction and the refractive power error in the sagittal direction take values obtained by performing ray tracing at a finite distance.

If a person for which the myopia-suppressive effect is to be exhibited is in a visual environment in which the person works long time with his eyes close to something, the person has already shown signs of myopia in many cases. For this reason, the spectacle lens according to a mode of the present disclosure is a unifocal lens for dealing with the object distance in a range from middle distances (1 m to 40 cm) to short distances (40 cm to 10 cm). That is to say, the first area of the spectacle lens according to a mode of the present disclosure exhibits the functionality of this unifocal lens. Needless to say, the technical idea of the present disclosure is also applicable to a unifocal lens for dealing with an infinite point, but a unifocal lens for dealing with middle to short distances will be taken as an example of a mode of the present disclosure.

The spectacle lens according to a mode of the present disclosure is often a unifocal lens for dealing with middle to short distances. For this reason, when the refractive power error in the meridional direction or the refractive power error in the sagittal direction is set, if the refractive power error is set so as to take a value obtained by performing ray tracing at a finite distance, a spectacle lens that is more suitable for an actual situation can ultimately be obtained. The "finite distance" here refers to the object distance that is set as the aforementioned middle distance or short distance, or preferably that is set for a unifocal lens.

Although, in a mode of the present disclosure, the peripheral area of the spectacle lens is expressed as the distance from the lens center, it may alternatively be expressed as the rotation angle (in other words, angle of view) of an eyeball. In this case, the radius range from 4.5 mm to 25 mm from the lens center substantially corresponds to a rotation angle from 10 degrees to 45 degrees. The rotation angle is described in the specification etc. of Japanese Patent Application Laid-Open No. 1992-338918, for example, and a description thereof is omitted accordingly.

A more specific configuration of the spectacle lens according to a mode of the present disclosure will be described below.

Overall Configuration of Spectacle Lens

FIG. 2 is a front elevational view showing the shape of the spectacle lens according to a mode of the present disclosure.

As shown in FIG. 2, a spectacle lens 1 has a plurality of convex areas 6, which are regularly arranged around the lens center. These convex areas 6 are the second areas. The portion that is other than the convex areas 6 and serves as a base is the first area. A specific configuration of the convex areas 6 will be described later in detail.

FIG. 3 is a cross-sectional view showing an example configuration of the spectacle lens shown in FIG. 2.

As shown in FIG. 3, the spectacle lens 1 has a face 3 on an object side and a face 4 on an eyeball side. The "face on the object side" is a surface that is located on the object side when spectacles that include spectacle lenses 1 are worn by the wearer. The "face on the eyeball side" is a surface on the opposite side, i.e. the surface that is located on the eyeball side when the spectacles that include spectacle lenses 1 are worn by the wearer. In a mode of the present disclosure, the face 3 on the object side is a convex face, and the face 4 on the eyeball side is a concave face. That is to say, the spectacle lens 1 according to a mode of the present disclosure is a meniscus lens.

The spectacle lens 1 includes a lens base material 2, hard coatings 8 that are formed on the convex face side and the concave face side of the lens base material 2, and anti-reflection coatings (AR coatings) 10 that are formed on the surfaces of the respective hard coatings 8. Note that other coatings may also be formed, in addition to the hard coatings 8 and the anti-reflection coatings 10, on the spectacle lens 1.

Lens Base Material

The lens base material 2 is made of, for example, a thermosetting resin material such as thiourethane, allyl, acryl, or epithio. Note that any other resin material with which a desired refractivity can be obtained may be selected as a resin material that constitutes the lens base material 2. Also, a lens base material that is made of inorganic glass, rather than a resin material, may alternatively be employed.

In a mode of the present disclosure, the face 3 (convex face) on the object side of the lens base material 2 is provided with a plurality of convex areas 6a, which are formed so as to protrude from the face toward the object side. Each of the convex areas 6a is constituted by a curved face with a curvature that differs from that of the face 3 on the object side of the lens base material 2.

Due to these convex areas 6a being formed, the convex areas 6a, each of which has a substantially circular shape, are arranged as islands with equal gaps therebetween around the lens center, on the face 3 on the object side of the lens base material 2 when viewed in a plan view. In other words, the convex areas 6a, each of which has a substantially circular shape, are arranged in a state of being spaced apart from each other without being adjacent to each other, i.e. in a state where the first area serving as the base is present between the convex areas 6a.

Note that a plurality of convex areas 6a may alternatively be formed on the face 4 (concave face) on the eyeball side of the lens base material 2. Furthermore, a plurality of convex areas 6a may be formed on both faces, namely on the convex face and the concave face. For convenience of description, the case of forming the plurality of convex areas 6a on the face 3 (convex face) on the object side will be described below as an example.

Hard Coating

The hard coatings 8 are formed using a thermoplastic resin or a UV-curable resin, for example. The hard coatings 8 can be formed using a method of immersing the lens base material 2 in a hard coating agent, or by means of spin coating or the like. Due to being coated with these hard coatings 8, the durability of the spectacle lens 1 can be improved.

Anti-Reflection Coating

The anti-reflection coatings 10 are formed by forming films of an anti-reflection agent such as $ZrO_2$, $MgF_2$, or $Al_2O_3$ by means of vacuum evaporation, for example. Due to being coated with these anti-reflection coatings 10, the visibility of an object viewed through the spectacle lens 1 can be improved.

Shape of Face on Object Side

As mentioned above, a plurality of convex areas 6a are formed on the face 3 on the object side of the lens base material 2. Accordingly, if this face 3 is coated with the hard coating 8 and the anti-reflection coating 10, a plurality of convex areas 6b are also formed with the hard coating 8 and the anti-reflection coating 10, following the convex areas 6a on the lens base material 2. That is to say, convex areas 6, each of which is constituted by a convex area 6a and a convex area 6b, are arranged on the face 3 (convex face) on the object side of the spectacle lens 1 so as to protrude from the face 3 toward the object.

Similar to the convex areas 6a, the convex areas 6, which are formed following the convex areas 6a on the lens base material 2, are arranged as islands at equal gaps therebetween in the circumferential direction and the radial direction around the lens center, i.e. in a state of being regularly arrayed around the lens center.

In another mode of the present disclosure, the convex areas 6 may be formed by at least either the hard coating 8 or the anti-reflection coating 10, rather than by providing the convex areas 6a on the lens base material 2.

Note that the convex areas 6 may be provided at a portion through which the optical axis at the lens center passes, as shown in FIG. 2 of the present application, or an area in which the convex areas 6 are not provided may be secured at a portion through which the optical axis passes. For reference, one example of an area in which convex areas are not provided that is secured at a portion through which an optical axis passes is shown in FIG. 1 of Patent Document 1.

Each of the convex areas 6 is configured as follows, for example. It may be desired that the diameter of each convex area 6 is about 0.8 mm to 2.0 mm. It may be desired that the protruding height (protruding amount) of each convex area 6 is about 0.1 to 10 μm, or even about 0.7 to 0.9 μm. Each convex area 6 has a spherical shape with a curvature radius of 50 to 250 mm, or even about 86 mm. Due to this configuration, the refractive power of each convex area 6 is made larger than the refractive power in the area in which the convex areas 6 are not formed, by about 2.00 to 5.00 diopters.

Optical Properties

Due to having the convex areas 6 on the object-side face 3, the spectacle lens 1 with the above-described configuration may achieve the following optical properties, and can suppress, as a result, the progression of refractive errors, such as myopia, of a wearer of the spectacles.

FIG. 4 is a schematic cross-sectional view (part 1) showing paths of light that is transmitted through the spectacle lens shown in FIG. 2.

As shown in FIG. 4, light that is incident on an area in which the convex areas 6 are not formed in the object-side face 3 of the spectacle lens 1, i.e. the first area serving as the base, exits from the eyeball-side face 4 and is then focused on a retina 20a of an eyeball 20. That is to say, light rays that are transmitted through the spectacle lens 1 are, in principle, focused on the retina 20a of the wearer of the spectacles. In other words, the first area serving as the base of the spectacle lens 1 has a curvature that is set in accordance with a prescription for the wearer of the spectacles such that light is focused at a predetermined position A on the retina 20a.

FIG. 5 is a schematic cross-sectional view (part 2) showing paths of light that is transmitted through the spectacle lens shown in FIG. 2.

Meanwhile, as shown in FIG. 5, light that is incident on the convex areas 6 of the spectacle lens 1 exits from the eyeball-side face 4 and is then focused at positions B, which are located on the object side relative to the retina 20a of the eyeball 20. That is to say, the convex areas 6 cause light that exits from the face 4 on the eyeball side to converge at the positions B located on the object side relative to the focal position A. These focal positions B are present as positions $B_1, B_2, B_3, \ldots B_N$ (N is the total number of convex areas 6) in correspondence with the respective convex areas 6.

Thus, in principle, the spectacle lens 1 causes light rays incident on the object-side face 3 to exit from the eyeball-side face 4, and to converge at the predetermined position A. Meanwhile, at the portions at which the convex areas 6 are arranged, the spectacle lens 1 causes light rays to converge at the positions B ($B_1, B_2, B_3, \ldots B_N$) located on the object side relative to the predetermined position A. That is to say, the spectacle lens 1 is configured to cause light rays to converge on the positions B on the object side, in addition to causing light rays to converge to realize the prescription of the wearer of the spectacles. Due to having such optical properties, the spectacle lens 1 exhibits a myopia progression-suppressive effect.

Method for Designing Spectacle Lens According to Mode of Present Disclosure

The technical idea of the present disclosure is also applicable to a method for designing a spectacle lens. The configuration thereof is as follows.

"A method for designing a spectacle lens that includes:
a first area that causes light rays incident on an object-side face of the lens to exit from an eyeball-side face of the lens and to converge at a predetermined position A on a retina of a wearer; and
a plurality of second areas configured to cause light rays to converge at a position B on the object side relative to the position A,
the method including:
setting, in the first area in a peripheral area of the spectacle lens that is a radius range from 4.5 mm to 25 mm of a lens center, a refractive power error in a meridional direction and a refractive power error in a sagittal direction to values that cause light rays to converge in a direction extending from a vicinity of the position A toward the position B."

It may be desired to apply the method for designing a spectacle lens according to a mode of the present disclosure to an example that is the same as the already-described spectacle lens, and a description thereof is omitted accordingly.

Method for Producing Spectacle Lens

The technical idea of the present disclosure is also applicable to a method for producing a spectacle lens that employs the above method for designing a spectacle lens. A specific example of the method for producing the spectacle lens 1 will be described.

To produce the spectacle lens 1, first, the lens base material 2 is molded using a known molding method, such as cast polymerization. For example, by performing molding by means of cast polymerization using a mold that has a molding face provided with a plurality of concave portions, a lens base material 2 is obtained that has the convex areas 6 on at least one of the surfaces.

After the lens base material 2 has been obtained, next, the hard coatings 8 are formed on the surfaces of the lens base material 2. The hard coatings 8 can be formed using a method of immersing the lens base material 2 in a hard coating agent, spin coating, or the like.

After the hard coatings 8 have been formed, the anti-reflection coatings 10 are then formed on the surfaces of the hard coatings 8. The hard coatings 8 can be formed by depositing an anti-reflection agent by means of vacuum evaporation.

With the production method with the above procedure, the spectacle lens 1 is obtained that has, on the face 3 on the object side, a plurality of convex areas 6 that protrude toward the object.

In Case of Exhibiting Hyperopia Progression-Suppressive Effect

A hyperopia progression-suppressive effect is exhibited by replacing the convex areas with concave areas, and also replacing the positions B on the object side with positions C on the distal side in the spectacle lens and the method for designing the spectacle lens that have been described thus far.

A mode of exhibiting the hyperopia progression-suppressive effect is as follows.

"A spectacle lens including:
a first area that causes light rays incident on an object-side face of the lens to exit from an eyeball-side face of the lens and to converge at a predetermined position A on a retina of a wearer; and
a plurality of second areas configured to cause light rays to converge at a position C on the distal side relative to the position A,
wherein, in the first area in a peripheral area of the spectacle lens that is a radius range from 4.5 mm to 25 mm of a lens center, a refractive power error in a meridional direction and a refractive power error in a sagittal direction have values that cause light rays to converge in a direction extending from a vicinity of the position A toward the position C."

In the case of a mode of exhibiting the hyperopia progression-suppressive effect, it may be desired to implement an example as follows.

"The second areas are concave areas, and
in the first area in the peripheral area, both the refractive power error in the meridional direction and the refractive power error in the sagittal direction are +0.25 D or less."

"The refractive power error in the meridional direction or the refractive power error in the sagittal direction (e.g. the refractive power error in the meridional direction) is −0.12 D or more and +0.12 D or less, and takes a value higher than the value of the other refractive power error (e.g. the refractive power error in the sagittal direction)."

Note that the concave areas are, literally, areas that are formed with recesses. The concave areas may have a shape obtained by recessing the convex shape of the micro convex portions (e.g., convex areas 6 as described with reference to FIGS. 2 and 3 above) toward the opposite side. Other shapes, arrangements, and so on are provided by replacing "convex" with "concave" in the above descriptions of "Lens Base Material", "Shape of Face on Object Side", and "Optical Properties".

EMBODIMENTS

Next, embodiments will be described to specifically describe the present disclosure. Needless to say, the present disclosure is not limited to the following embodiments.

Embodiment 1

The following spectacle lens was designed. Note that all of the spectacle lenses in the embodiments have the first area serving as a base and the second areas that are the convex areas. The overview of the configuration is as shown in FIG. 2.

S: −1.00 D
C: 0.00 D
Base curve: 1.0 D
n=1.589

The outer face, which is the face on the object side, was set to be spherical.
The inner face, which is the face on the eyeball side, was set to be aspherical.
The object distance was set to be infinite.
Outer-face curvature radius: r1=589.00 mm
Inner-face curvature radius: r2=294.407 mm
Center thickness: 1.0 mm
Eyeball rotation center position: 24 mm from the inner face vertex
Convex area shape: Spherical
Design target: The refractive power error in the meridional direction (Meridional: M) was set to substantially zero. The refractive power error in the sagittal direction (Sagittal: S) was set to a positive value.

Note that the expression for the inner aspherical face is as follows.

$$x = \frac{Cp^2}{1+\sqrt{1-KC^2\rho^2}} + A_4\rho^4 + A_5\rho^5 + A_6\rho^6 + A_7\rho^7 + A_8\rho^8 \quad \text{[Expression 1]}$$

ρ is as follows:

$$\rho = \sqrt{y^2 + z^2} \quad \text{[Expression 2]}$$

In Embodiment 1, values of the symbols in the expression for the inner aspherical face are as follows.
C=1/r2=0.003396654877626333276740237691002
K=1.0
A4=−2.3251516E-7
A5=−4.1016978E-9
A6=5.4002311E-10
A7=−1.4792439E-11
A8=1.4112335E-13

For example, A4=−2.3251516E-7 indicates −2.3251516×10−7.

Differences between the embodiments are collectively shown in the following table.

TABLE 1

|  | Embodiment 1 | Embodiment 2 | Embodiment 3 | Embodiment 4 | Embodiment 5 | Embodiment 6 |
|---|---|---|---|---|---|---|
| S Power [D] | −1.00 | −4.00 | −4.00 | −1.00 | −4.00 | −1.00 |
| Base Curve [D] | 1.00 | 1.00 | 1.00 | 1.00 | 3.00 | 3.00 |
| Object Distance | ∞ | ∞ | 400 mm | 400 mm | ∞ | ∞ |
| Inner Face Shape | Aspherical | Aspherical | Aspherical | Aspherical | Aspherical | Aspherical |
| Design Target | Transmission power error in meridional direction → Substantially zero; Transmission power error in sagittal direction → Plus | Transmission power error in meridional and sagittal directions → Zero or more; Also, difference therebetween is substantially zero | Transmission power error in meridional direction → Substantially zero; Transmission power error in sagittal direction → Plus | Transmission power error in meridional and sagittal directions → Zero or more; Also, difference therebetween is substantially zero | Transmission power error in meridional direction → Substantially zero; Transmission power error in sagittal direction → Plus | Transmission power error in meridional and sagittal directions → Zero or more; Also, difference therebetween is substantially zero |

|  | Embodiment 7 | Embodiment 8 | Comparative Example 1 |
|---|---|---|---|
| S Power [D] | −1.00 | −4.00 | −1.00 |
| Base Curve [D] | 3.00 | 3.00 | 3.00 |
| Object Distance | 400 mm | 400 mm | ∞ |
| Inner Face Shape | Aspherical | Aspherical | Spherical |
| Design Target | Transmission power error in meridional direction → Substantially zero; Transmission power error in sagittal direction → Plus | Transmission power error in meridional and sagittal directions → Zero or more; Also, difference there between is substantially zero | — |

FIG. 6A is a plot showing the relationship between the distance from the lens center (horizontal axis) and surface refractive power on a lens inner face (aspherical face) in Embodiment 1 (vertical axis).

FIG. 6B is a plot showing the relationship between the distance from the lens center (horizontal axis) and a transmission power error in the meridional direction and a transmission power error in the sagittal direction in the first area (base portion) of the spectacle lens in Embodiment 1 (vertical axis).

As shown in FIG. 6B, in Embodiment 1, the refractive power error in the meridional direction was set to substantially zero, and the refractive power error in the sagittal direction was set to a positive value, as defined by the design target. That is to say, even if a refractive power error occurred, the value of the refractive power error was set such that the focal position was not excessively moved in the rear direction. As a result, the effect of suppressing the progression of myopia or hyperopia is not impaired even in the peripheral area of the spectacle lens.

Comparative Example 1

The case where requirements in a mode of the present disclosure are not satisfied (Comparative Example 1) will be briefly described. Parameters that were changed from the design in Embodiment 1 are as follows. Parameters other than the following parameters are the same as those in Embodiment 1.
 Base curve: 3.0 D
 The outer face, which is the face on the object side, was set to be spherical.
 Outer-face curvature radius: r1=196.333 mm
 Inner-face curvature radius: r2=147.041 mm
 Design target: Not provided due to both faces being spherical FIG. 1A is a plot showing the relationship between the distance from the lens center (horizontal axis) and surface refractive power on a lens inner face (aspherical face) in the later-described Comparative Example 1 (vertical axis).

FIG. 1B is a plot showing the relationship between the distance from the lens center (horizontal axis) and a transmission power error in the meridional direction and a transmission power error in the sagittal direction in the first area (base portion) of the spectacle lens in the later-described Comparative Example 1 (vertical axis).

As shown in FIG. 1B, in Comparative Example 1, the refractive power error in the meridional direction increases in the minus direction in the peripheral area of the spectacle lens that is a radius range from 4.5 mm to 25 mm from the lens center. The increase in the refractive power error in the minus direction means that the focal position moves toward the distal side, i.e. in the rear direction. As a result, in Comparative Example 1, there is concern that "movement of the focal position in the distal direction", which may inhibit suppression of the progression of hyperopia, will occur.

Embodiment 2

Parameters that were changed from the design in Embodiment 1 are as follows. Parameters other than the following parameters are the same as those in Embodiment 1.
 S: −4.00 D
 Inner-face curvature radius: r2=117.785 mm
 Design target: The refractive power error in the meridional direction (Meridional: M) and the refractive power error in the sagittal direction (Sagittal: S) were set to zero or more, and the difference therebetween was set to substantially zero.

Values of the symbols in the expression for the inner aspherical face that differ from those in Embodiment 1 are as follows.
 $C=1/r2=0.0084900334854361799660441426146$
 $A4=-8.6406935E-07$
 $A5=-2.4341730E-09$
 $A6=7.7912471E-10$
 $A7=-1.7568504E-11$
 $A8=1.3516874E-13$ FIG. 7A is a plot showing the relationship between the distance from the lens center (horizontal axis) and surface refractive power on a lens inner face (aspherical face) in Embodiment 2 (vertical axis).

FIG. 7B is a plot showing the relationship between the distance from the lens center (horizontal axis) and a transmission power error in the meridional direction and a transmission power error in the sagittal direction in the first area (base portion) of the spectacle lens in Embodiment 2 (vertical axis).

As shown in FIG. 7B, in Embodiment 2, the refractive power error in the meridional direction and the refractive power error in the sagittal direction were set to zero or more, and the difference therebetween was set to substantially zero, as defined by the design target. That is to say, astigmatism was set to substantially zero. That is to say, even if a refractive power error occurred, the value of the refractive power error was set such that the focal position was not excessively moved in the rear direction. As a result, the effect of suppressing the progression of myopia or hyperopia is not impaired even in the peripheral area of the spectacle lens.

Embodiment 3

Parameters that were changed from the design in Embodiment 1 are as follows. Parameters other than the following parameters are the same as those in Embodiment 1.
 S: −4.00 D
 The object distance was to set to 400 mm.
 Inner-face curvature radius: r2=117.785 mm
 Values of the symbols in the expression for the inner aspherical face that differ from those in Embodiment 1 are as follows.
 $C=1/r2=0.0084900334854361799660441426146$
 $A4=-5.1590858E-07$
 $A5=4.7732903E-09$
 $A6=1.4614985E-10$
 $A7=-1.3000922E-12$
 $A8=-1.2863666E-14$ FIG. 8A is a plot showing the relationship between the distance from the lens center (horizontal axis) and surface refractive power on a lens inner face (aspherical face) in Embodiment 3 (vertical axis).

FIG. 8B is a plot showing the relationship between the distance from the lens center (horizontal axis) and a transmission power error in the meridional direction and a transmission power error in the sagittal direction in the first area (base portion) of the spectacle lens in Embodiment 3 (vertical axis).

As shown in FIG. 8B, in Embodiment 3, the refractive power error in the meridional direction was set to substantially zero, and the refractive power error in the sagittal direction was set to a positive value, as defined by the design target. That is to say, even if a refractive power error occurred, the value of the refractive power error was set such that the focal position was not excessively moved in the rear direction. As a result, the effect of suppressing the progression of myopia or hyperopia is not impaired even in the peripheral area of the spectacle lens.

Embodiment 4

Parameters that were changed from the design in Embodiment 1 are as follows. Parameters other than the following parameters are the same as those in Embodiment 1.

The object distance was to set to 400 mm.

Design target: The refractive power error in the meridional direction (Meridional: M) and the refractive power error in the sagittal direction (Sagittal: S) were set to zero or more, and the difference therebetween was set to substantially zero.

Values of the symbols in the expression for the inner aspherical face that differ from those in Embodiment 1 are as follows.

$C=1/r2=0.0118941844706547368421052 6315789$
$A4=-2.5708138E-07$
$A5=3.5356031E-09$
$A6=4.0566938E-11$
$A7=-7.5616032E-13$
$A8=-3.6045394E-15$

FIG. 9A is a plot showing the relationship between the distance from the lens center (horizontal axis) and surface refractive power on a lens inner surface (aspherical face) in Embodiment 4.

FIG. 9B is a plot showing the relationship between the distance from the lens center (horizontal axis) and a transmission power error in the meridional direction and a transmission power error in the sagittal direction in the first area (base portion) of the spectacle lens in Embodiment 4 (vertical axis).

As shown in FIG. 9B, in Embodiment 4, the refractive power error in the meridional direction and the refractive power error in the sagittal direction were set to zero or more, and the difference therebetween was set to substantially zero, as defined by the design target. That is to say, astigmatism was set to substantially zero. That is to say, even if a refractive power error occurred, the value of the refractive power error was set such that the focal position was not excessively moved in the rear direction. As a result, the effect of suppressing the progression of myopia or hyperopia is not impaired even in the peripheral area of the spectacle lens.

Embodiment 5

Parameters that were changed from the design in Embodiment 1 are as follows. Parameters other than the following parameters are the same as those in Embodiment 1.
S: −4.00 D
Base curve: 3.0 D
Outer-face curvature radius: r1=196.333 mm
Inner-face curvature radius: r2=84.075 mm
Values of the symbols in the expression for the inner aspherical face that differ from those in Embodiment 1 are as follows.
$C=1/r2=0.0118941844706547368421052 6315789$
$A4=-3.8714886E-07$
$A5=-3.4591069E-09$
$A6=5.8607762E-10$
$A7=-1.4532515E-11$
$A8=1.4579488E-13$ FIG. 10A is a plot showing the relationship between the distance from the lens center (horizontal axis) and surface refractive power on a lens inner surface (aspherical face) in Embodiment 5.

FIG. 10B is a plot showing the relationship between the distance from the lens center (horizontal axis) and a transmission power error in the meridional direction and a transmission power error in the sagittal direction in the first area (base portion) of the spectacle lens in Embodiment 5 (vertical axis).

As shown in FIG. 10B, in Embodiment 5, the refractive power error in the meridional direction was set to substantially zero, and the refractive power error in the sagittal direction was set to a positive value, as defined by the design target. That is to say, even if a refractive power error occurred, the value of the refractive power error was set such that the focal position was not excessively moved in the rear direction. As a result, the effect of suppressing the progression of myopia or hyperopia is not impaired even in the peripheral area of the spectacle lens.

Embodiment 6

Parameters that were changed from the design in Embodiment 1 are as follows. Parameters other than the following parameters are the same as those in Embodiment 1.
Base curve: 3.00 D
Outer-face curvature radius: r1=196.333 mm
Inner-face curvature radius: r2=147.041 mm
Design target: The refractive power error in the meridional direction (Meridional: M) and the refractive power error in the sagittal direction (Sagittal: S) were set to zero or more, and the difference therebetween was set to substantially zero.
Values of the symbols in the expression for the inner aspherical face that differ from those in Embodiment 1 are as follows.
$C=1/r2=0.0068008058628448896434 6349745331$
$A4=-1.7774001E-07$
$A5=-6.1130668E-09$
$A6=5.8023185E-10$
$A7=-1.5111573E-11$
$A8=1.4122326E-13$ FIG. 11A is a plot showing the relationship between the distance from the lens center (horizontal axis) and surface refractive power on a lens inner surface (aspherical face) in Embodiment 6.

FIG. 11B is a plot showing the relationship between the distance from the lens center (horizontal axis) and a transmission power error in the meridional direction and a transmission power error in the sagittal direction in the first area (base portion) of the spectacle lens in Embodiment 6 (vertical axis).

As shown in FIG. 11B, in Embodiment 6, the refractive power error in the meridional direction and the refractive power error in the sagittal direction were set to zero or more, and the difference therebetween was set to substantially zero, as defined by the design target. That is to say, astigmatism was set to substantially zero. That is to say, even if a refractive power error occurred, the value of the refractive power error was set such that the focal position was not excessively moved in the rear direction. As a result, the effect of suppressing the progression of myopia or hyperopia is not impaired even in the peripheral area of the spectacle lens.

Embodiment 7

Parameters that were changed from the design in Embodiment 1 are as follows. Parameters other than the following parameters are the same as those in Embodiment 1.
Base curve: 3.0 D
The object distance was set to be 400 mm.
Outer-face curvature radius: r1=196.333 mm
Inner-face curvature radius: r2=147.041 mm
Values of the symbols in the expression for the inner aspherical face that differ from those in Embodiment 1 are as follows.
C=1/r2=0.0068008058628448896434634974533l
A4=−1.4060042E-07
A5=1.695817E-09
A6=6.2492899E-11
A7=−1.4892971E-12
A8=8.663421E-15

FIG. 12A is a plot showing the relationship between the distance from the lens center (horizontal axis) and surface refractive power on a lens inner face (aspherical face) in Embodiment 7 (vertical axis).

FIG. 12B is a plot showing the relationship between the distance from the lens center (horizontal axis) and a transmission power error in the meridional direction and a transmission power error in the sagittal direction in the first area (base portion) of the spectacle lens in Embodiment 7 (vertical axis).

As shown in FIG. 12B, in Embodiment 7, the refractive power error in the meridional direction was set to substantially zero, and the refractive power error in the sagittal direction was set to a positive value, as defined by the design target. That is to say, even if a refractive power error occurred, the value of the refractive power error was set such that the focal position was not excessively moved in the rear direction. As a result, the effect of suppressing the progression of myopia or hyperopia is not impaired even in the peripheral area of the spectacle lens.

Embodiment 8

Parameters that were changed from the design in Embodiment 1 are as follows. Parameters other than the following parameters are the same as those in Embodiment 1.
S: −4.00 D
Base curve: 3.0 D
The object distance was to set to 400 mm.
Outer-face curvature radius: r1=196.333 mm
Inner-face curvature radius: r2=84.075 mm
Design target: The refractive power error in the meridional direction (Meridional: M) and the refractive power error in the sagittal direction (Sagittal: S) were set to zero or more, and the difference therebetween was set to substantially zero.
Values of the symbols in the expression for the inner aspherical face that differ from those in Embodiment 1 are as follows.
C=1/r2=0.01189418447065473684210526315789
A4=−3.7290196E-07
A5=5.4200462E-09
A6=7.0189935E-11
A7=−4.7759548E-13
A8=−9.6189829E-15

FIG. 13A is a plot showing the relationship between the distance from the lens center (horizontal axis) and surface refractive power on a lens inner face (aspherical face) in Embodiment 8 (vertical axis).

FIG. 13B is a plot showing the relationship between the distance from the lens center (horizontal axis) and a transmission power error in the meridional direction and a transmission power error in the sagittal direction in the first area (base portion) of the spectacle lens in Embodiment 8 (vertical axis).

As shown in FIG. 13B, in Embodiment 8, the refractive power error in the meridional direction and the refractive power error in the sagittal direction were set to zero or more, and the difference therebetween was set to substantially zero, as defined by the design target. That is to say, astigmatism was set to substantially zero. That is to say, even if a refractive power error occurred, the value of the refractive power error was set such that the focal position was not excessively moved in the rear direction. As a result, the effect of suppressing the progression of myopia or hyperopia is not impaired even in the peripheral area of the spectacle lens.

An aspect of the "spectacle lens and method for designing the same" of the present disclosure is summarized below.

An embodiment of the present disclosure is as follows. "A spectacle lens including:

a first area that causes light rays incident on an object-side face of the lens to exit from an eyeball-side face of the lens and to converge at a predetermined position A on a retina of a wearer; and a plurality of second areas configured to cause light rays to converge at a position B on the object side or a position C on the distal side relative to the position A, wherein, in the first area in a peripheral area of the spectacle lens that is a radius range from 4.5 mm to 25 mm of a lens center, a refractive power error in a meridional direction and a refractive power error in a sagittal direction have values that cause light rays to converge in a direction extending from a vicinity of the position A toward the position B if the second areas cause the light rays to converge at the position B, or have values that cause light rays to converge in a direction extending from the vicinity of the position A toward the position C if the second areas cause the light rays to converge at the position C."

The invention claimed is:

1. A spectacle lens comprising:

a first area that causes light rays incident on an object-side face of the lens to exit from an eyeball-side face of the lens and to converge at a predetermined position A on a retina of a wearer; and a plurality of second areas configured to cause light rays to converge at a position B on the object side or a position C on the distal side relative to the position A, wherein, in the first area in a peripheral area of the spectacle lens that is a radius range from 4.5 mm to 25 mm of a lens center, a refractive power error in a meridional direction and a refractive power error in a sagittal direction have values that cause light rays to converge in a direction extending from a vicinity of the position A toward the position B if the second areas cause the light rays to converge at the position B, or have values that cause light rays to converge in a direction extending from the vicinity of the position A toward the position C if the second areas cause the light rays to converge at the position C.

2. The spectacle lens according to claim 1,
wherein the second areas are convex areas, and
in the first area in the peripheral area, both the refractive power error in the meridional direction and the refractive power error in the sagittal direction are −0.25 D or more.

3. The spectacle lens according to claim 1,
wherein the second areas are convex areas, and
the refractive power error in the meridional direction or the refractive power error in the sagittal direction is −0.12 D or more and +0.12 D or less, and takes a value lower than a value of the other refractive power error.

4. The spectacle lens of claim 1,
wherein the refractive power error in the meridional direction or the refractive power error in the sagittal direction takes a value obtained by performing ray tracing at a finite distance.

5. A method for designing a spectacle lens that includes:
a first area that causes light rays incident on an object-side face of the lens to exit from an eyeball-side face of the lens and to converge at a predetermined position A on a retina of a wearer; and
a plurality of second areas configured to cause light rays to converge at a position B on the object side or a position C on the distal side relative to the position A, the method including:
setting, in the first area in a peripheral area of the spectacle lens that is a radius range from 4.5 mm to 25 mm of a lens center, a refractive power error in a meridional direction and a refractive power error in a sagittal direction to values that cause light rays to converge in a direction extending from a vicinity of the position A toward the position B if the second areas cause the light rays to converge at the position B, or to values that cause light rays to converge in a direction extending from the vicinity of the position A toward the position C if the second areas cause the light rays to converge at the position C.

6. The method for designing a spectacle lens according to claim 5,
wherein the second areas are convex areas, and
in the first area in the peripheral area, both the refractive power error in the meridional direction and the refractive power error in the sagittal direction are −0.25 D or more.

\* \* \* \* \*